United States Patent
Nakamura

(10) Patent No.: US 7,502,381 B2
(45) Date of Patent: Mar. 10, 2009

(54) NETWORK TERMINAL, NETWORK SYSTEM, METHOD OF CONTROLLING NETWORK TERMINAL, AND PROGRAM

(75) Inventor: Mitsuaki Nakamura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 848 days.

(21) Appl. No.: 10/814,144

(22) Filed: Apr. 1, 2004

(65) Prior Publication Data

US 2004/0196872 A1   Oct. 7, 2004

(30) Foreign Application Priority Data

Apr. 1, 2003  (JP)  ............... 2003-098543

(51) Int. Cl.
*H04L 12/54* (2006.01)
*H04B 7/212* (2006.01)
*H04L 12/403* (2006.01)
*H04J 3/00* (2006.01)
*H04J 3/06* (2006.01)

(52) U.S. Cl. .............. 370/432; 370/444; 370/453; 370/455; 370/510; 370/512

(58) Field of Classification Search ........... 370/512, 370/498, 503, 254, 255, 432, 395.42, 444, 370/455, 216–220, 509, 510
See application file for complete search history.

(56) References Cited

U.S. PATENT DOCUMENTS

| | | | | |
|---|---|---|---|---|
| 5,751,220 A | * | 5/1998 | Ghaffari | 340/825.21 |
| 5,878,095 A | * | 3/1999 | Kainulainen | 375/357 |
| 6,317,475 B1 | * | 11/2001 | Kasurinen | 375/356 |
| 6,411,616 B1 | * | 6/2002 | Donahue et al. | 370/352 |
| 6,434,113 B1 | | 8/2002 | Gubbi | |
| 6,480,480 B1 | | 11/2002 | Du | |
| 6,608,824 B1 | * | 8/2003 | Sugaya | 370/337 |
| 6,891,478 B2 | * | 5/2005 | Gardner | 340/635 |
| 6,987,967 B2 | * | 1/2006 | Maeshima et al. | 455/422.1 |
| 2002/0032025 A1 | * | 3/2002 | Maeshima et al. | 455/422 |

(Continued)

FOREIGN PATENT DOCUMENTS

JP   10-308697 A   11/1998

(Continued)

*Primary Examiner*—Seema S Rao
*Assistant Examiner*—Xavier Szewai Wong
(74) *Attorney, Agent, or Firm*—Birch, Stewart, Kolasch & Birch, LLP

(57) ABSTRACT

A network terminal of the present invention includes: a synchronization information frame receiving section for receiving a synchronization information frame from a master terminal; a network information managing section for maintaining the network by being synchronized with the synchronization information frame; a synchronization information frame missing detection section for detecting the missing of the synchronization information frame from the master terminal; a priority list storing section for storing a priority list which defines a synchronization information frame transmission start time in such a manner as to differentiate synchronization information frame transmission start times between the network terminals; and a synchronization information frame transmission section for, in a case where the network terminal acts as a new master terminal of the network system, periodically outputting a synchronization information frame, from the synchronization information frame transmission start time in accordance with the priority list, synchronization information frame transmitting section starting to output the synchronization information frame after the missing of the synchronization information frame is detected.

11 Claims, 15 Drawing Sheets

U.S. PATENT DOCUMENTS

| | | |
|---|---|---|
| 2002/0054572 A1* | 5/2002 | Saleh et al. ............... 370/254 |
| 2002/0055978 A1 | 5/2002 | Joon-Bo et al. |
| 2002/0116460 A1 | 8/2002 | Treister et al. |
| 2002/0193945 A1 | 12/2002 | Tan et al. |
| 2004/0010605 A1* | 1/2004 | Furukawa et al. ........... 709/229 |
| 2004/0179488 A1 | 9/2004 | Kim et al. |
| 2004/0203822 A1* | 10/2004 | Vitebsky ................. 455/452.1 |
| 2005/0164689 A1 | 7/2005 | Maeshima et al. |
| 2005/0164697 A1 | 7/2005 | Maeshima et al. |

FOREIGN PATENT DOCUMENTS

| | | |
|---|---|---|
| JP | 10-308698 A | 11/1998 |
| JP | 11-239138 A | 8/1999 |
| JP | 2002-111689 A | 4/2002 |
| JP | 2002-111689 A | 4/2002 |
| JP | 2002-223217 A | 8/2002 |
| JP | 2003-23434 A | 1/2003 |
| JP | 2004-282758 A | 10/2004 |

* cited by examiner

FIG. 6

| NETWORK TERMINAL IDENTIFICATION NUMBER MA(n) | MASTER TERMINAL FUNCTION FLAG Mc(n) | NUMBER OF MANAGEABLE TERMINALS Nt(n) | NUMBER OF SETS OF MANAGEABLE BAND GUARANTEE INFORMATION Nb(n) | PRIORITY OF DATA WHICH IS CURRENTLY TRANSMITTED Dp(n) | ... |

FIG. 7

| TERMINAL | Mc(n) | Nt(n) | Nb(n) | MASTER TERMINAL PRIORITIES P(n) |
|---|---|---|---|---|
| A | 1 | 128 | 256 | 25728 |
| B | 1 | 64 | 128 | 12864 |
| C | 0 | 0 | 0 | 0 |

FIG. 8

| TERMINAL | Mc(n) | Dp(n) | Nt(n) | Nb(n) | MASTER TERMINAL PRIORITIES P(n) |
|---|---|---|---|---|---|
| A | 1 | 1 | 128 | 256 | 3680 |
| B | 1 | 7 | 64 | 128 | 8344 |
| C | 0 | 7 | 0 | 0 | 0 |

FIG. 9

| IDENTIFICATION NUMBER OF TERMINAL IN FIRST PRIORITY LEVEL | IDENTIFICATION NUMBER OF TERMINAL IN SECOND PRIORITY LEVEL | IDENTIFICATION NUMBER OF TERMINAL IN THIRD PRIORITY LEVEL | ... |
|---|---|---|---|

NETWORK TERMINAL, NETWORK SYSTEM, METHOD OF CONTROLLING NETWORK TERMINAL, AND PROGRAM

This Nonprovisional application claims priority under 35 U.S.C. § 119(a) on Patent Application No. 2003/98543 filed in Japan on Apr. 1, 2003, the entire contents of which are hereby incorporated by reference.

FIELD OF THE INVENTION

The present invention relates to a network terminal adopting a method such as TDMA (Time Division Multiple Access), a network system, and a method of controlling the network terminal.

BACKGROUND OF THE INVENTION

A conventional network system will be described with reference to FIGS. 15-17.

As shown in FIG. 15, a conventional network system is made up of a plurality of network terminals. In this network system, at least one of the network terminals is designated as a master terminal (master) for administering the network. The master terminal periodically outputs a synchronization information frame (beacon frame).

The synchronization information frame includes at least a network identifier for identifying the network system, a master terminal inherent number for identifying a sender of the synchronization information frame, a synchronization information frame interval indicating when the next synchronization information frame is sent, and band guarantee period information for specifying network terminals which can transmit information to another network terminal and for guaranteeing a transmission band.

The network terminals (slaves) other than the master terminal receive the synchronization information frame which is periodically sent from the master terminal, and then the network terminals are synchronized with synchronization information frame. Furthermore, in accordance with the band guarantee period information included in the synchronization information frame, each of the network terminals is allowed to carry out data transport only during a band guarantee period corresponding to that network terminal. With this, a band for the data transport between the network terminals is guaranteed.

To the master terminal, the network terminals also make requests for participating in the network system that is administered by the master terminal, and for transmitting a band guarantee period used after the participation in the network. Each time the master terminal receives such requests from the network terminals, the master terminal updates information which relates to the network and is included in the synchronization information frame. Correspondingly, each time the network terminals receive the synchronization information frame, the terminals have to follow an instruction in the synchronization information frame.

Since the master terminal and network terminals operate in such a network system, bands for communications between the network terminals are guaranteed and high-quality data transport for real-time contents such as videos is realized without the intermediary of the master terminal. Such a system has been taken by the Institute of Electrical and Electronics Engineering (IEEE) as a standard for PANs (Personal Area Networks), e.g. IEEE 802.15.3.

However, the above-mentioned system has a following problem: when the master terminal cannot transmit the synchronization information frame, or when a network terminal cannot receive the synchronization information frame, the network terminal operating in accordance with the synchronization information frame cannot be synchronized with the network and thus cannot carry out transmitting.

On the occasion that one of the followings occurs: (i) the transmitting of the synchronization information frame from the master terminal is likely to become inexecutable, (ii) the network is overloaded, and (iii) the network will be terminated, the process of allowing one of the network terminals to takeover the role of the master terminal is generally carried out before the transmitting of the synchronization information frame is stopped. With this process, even if the previous master terminal stops the transmitting of the synchronization information frame, a newly-designated master terminal starts to transmit a synchronization information frame and the remaining network terminals receive that frame, and hence the network is maintained. Note that, there are several ways to determine which network terminal takes over the role of the master terminal. For instance, a network terminal which is, in terms of capabilities, the most appropriate for the master terminal is selected, or the selection is made by the master terminal in advance. For instance, Japanese Laid-Open Patent Application No. 10-308697/1998 (Tokukaihei 10-308697; published on Nov. 17, 1998; hereinafter, Patent Document 1) is an example of the above. In this example, a master terminal supplies clock.

If the transmitting of the synchronization information frame from the master terminal is suddenly terminated for some reason before another network terminal takes over the role of the master terminal, the network terminals cannot receive the synchronization information frame so that the data transport between these terminals cannot be carried out. In this case, a master terminal is newly selected from the network terminals and the network is recovered, so that the data transport between the network terminals, which has been terminated due to the obstruction, is resumed.

To achieve this, a time chart in FIG. 16 showing a process by a new master terminal and a process by network terminals other than the new master terminal, and a flow chart in FIG. 17 shows a process until the data transport is resumed are required.

Referring to FIG. 17, the process until resuming the data transport is described below.

After missing the synchronization information frame (S400), a new master terminal is selected from the network terminals other than the existing master terminal (S401), and the new master terminal starts to transmit a synchronization signal (S402).

A network terminal other than the newly-selected master terminal waits for a synchronization information frame supplied from a master terminal (S403). If the network terminal receives the synchronization information frame from either the new master terminal or the existing master terminal (YES in S404), the network terminal is synchronized with and participates in a network administered by the master terminal from which the synchronization information frame is supplied (S405).

A network terminal, which carried out data transport to another network terminal before the obstruction, searches the network in which the network terminal newly participates for the target network terminal with which the network terminal communicated (S406).

If the target network terminal is not found (NO in S407), there is such a possibility that the target network terminal is in a network administered by another master terminal. On this account, the network terminal removes itself from the currently-participating network and then awaits a synchronization information frame from another master terminal (S408).

Meanwhile, if the target network terminal is found (YES in S407), the network terminal makes a band request to the master terminal (S409). The network terminal keeps making the band request until the master terminal accepts the same (S410). Once a band is allocated, the transmission between the network terminals starts (S411).

In the above-described arrangement, a new master terminal is selected from network terminals other than the previous master terminal, after the transmitting of the synchronization information frame from the previous master terminal (old master terminal) is stopped, as in above-mentioned S401. Being alternative to this, Japanese Laid-Open Patent Application No. 2002-111689 (Tokukai 2002-111689; published on Apr. 12, 2002; hereinafter, Patent Document 2) teaches that, before the master terminal (master) leaves the network, information concerning priorities for determining which network terminal (slave) will be the next master terminal is broadcasted in advance, and the next master terminal is selected in accordance with the information.

Note that, Patent Document 1 discloses a time division digital wireless mobile communication system for communications between mobile stations, which can disperse the loads on the mobile stations engaging in communications, by switching a mobile station (clock master) emitting an electric wave for synchronization at a predetermined timing.

In this time division digital wireless mobile communication system, the clock master makes a clock master switching request to mobile stations in slave mode, when the clock master meets a condition for transmitting the switching request. An example of the condition is such that the capabilities as a clock master diminish. Receiving this switching request, one of the mobile stations in the slave mode, which meets a condition for transmitting a clock master switching response, responds to the switching request. An example of the condition is such that a mobile station is the most suitable for a clock master in terms of capabilities. With this, as soon as the current clock master is relegated to a mobile station in the slave mode, one of the mobile terminals in the slave mode is designated as a new clock master.

Patent Document 2 also discloses a method of generating backup master information for selecting a new master on the occasion that at some point a device acting as a network master becomes no longer able to fulfill the role as the master.

This method of generating backup master information includes the steps of: (a) transmitting connection information from at least one of slaves in a network; (b) when a network master leaves the network, determining an order of priority of at least one of slaves which can act as a backup master, in accordance with the connection information; and (c) broadcasting the order of priority to another slave in the slaves.

However, the above-described conventional arrangement has such a problem that, when the transmitting of the synchronization information from the master terminal is suddenly terminated for some reason in the middle of data transport between the network terminals, the handover of the role of the master terminal as described in Patent Document 1 cannot be carried out, so that the transmitting of the synchronization information frame including band management information stops. As a result, the network terminals are no longer able to receive the synchronization information frame, thereby being impossible to continue the data transport therebetween.

Furthermore, when a network managed using a synchronization information frame malfunctions due to a failure in the previous master terminal and thus the construction of a new network is attempted, the following processes are typically carried out: a process of selecting a new master terminal from network terminals other than the previous master terminal; a process of participating in the network; a process of searching for a connection target; a process of making a band request and acquiring a band. As a result, if these processes take more than predetermined periods of time, real-time data such as video and audio transmitted before the failure is no longer able to reach the target network terminal, and thus the user of the target network terminal cannot enjoy the contents any more.

Moreover, if the previous master terminal still exists concurrently with a newly-selected master terminal, network terminals which communicated with each other may not be able to find each other on the occasion when these network terminals participate in different networks administered by the respective master terminals. In such a case, the network terminal is required to search for another master terminal, participate in the network administered by the same, and search for the target network terminal in the network, until the target network terminal is found. This further delays the resumption of the data transport, thereby resulting in the interruption of real-time data transport such as video and audio broadcast.

Even if the target network terminal is found as a result of the search in the network, a band allocated for the network terminals coupled in the previous network cannot be obtained, once other network terminals make a band request and obtain that band before the network terminals coupled in the previous network make a band request. This also obstructs the resumption the data transport interrupted by the failure.

According to Patent Document 2, the next master terminal is determined in advance so that the process of selecting a new master terminal is not required. However, Patent Document 2 also cannot solve the problems regarding the remaining processes. That is to say, although the priorities of slaves to be selected as a new master are determined in advance, it is still necessary to check the connection to a prospective master in order to recover the network, and this takes time.

SUMMARY OF THE INVENTION

The present invention was done to solve the above-identified problem, aiming for providing a network terminal which can shorten a period of no interaction between network terminals when a master terminal administering the network becomes not able to transmit a synchronization information frame, the network system, a method of controlling the network terminal, and a program.

To achieve this objective, a network terminal of the present invention, constituting a network system which is made up of a plurality of network terminals being capable of transmitting and receiving data and manages transmitting and receiving of data in accordance with a synchronization information frame periodically supplied from one of said plurality of network terminals which operates as a master terminal, is characterized by comprising: synchronization information frame receiving section for receiving the synchronization information frame from said master terminal; network information managing section for managing the network by being synchronized with the synchronization information frame received by the synchronization information frame receiving section; synchronization information frame missing detection section for detecting a missing of the synchronization information frame from said master terminal, when the synchronization information frame receiving section does not receive the synchronization information frame; synchronization information transmission start time storing section for storing synchronization information frame transmission start time information which defines a synchronization information frame transmission start time, said plurality of network terminals having different synchronization information frame transmission start times; and synchronization information frame transmitting section for, in a case where said network terminal acts as a new master terminal of the network system, periodically outputting a synchronization information frame including at least a part of information in the synchronization information frame received from said master terminal, from the synchronization information frame transmission start time defined by the synchronization information frame transmission start time information stored in the synchronization information transmission start time storing section, synchronization information frame transmitting section starting to output the synchronization information frame after the synchronization information frame missing detection section detects the missing of the synchronization information frame, after the synchronization information frame missing detection section detects the missing of the synchronization information frame, the synchronization information frame receiving section awaiting for a synchronization information frame from one of said plurality of network terminals whose synchronization information transmission start time is earlier than the synchronization information transmission start time of said network terminal, until the synchronization information frame transmission start time of said network terminal comes.

Also, a method of controlling a network terminal, constituting a network system which is made up of a plurality of network terminals being capable of transmitting and receiving data and manages transmitting and receiving of data in accordance with a synchronization information frame periodically supplied from one of said plurality of network terminals which operates as a master terminal, is characterized by comprising the steps of: detecting a missing of the synchronization information frame from said master terminal, when the synchronization information frame is not supplied from said master terminal; in a case where said network terminal acts as a new master terminal of the network system, periodically outputting a synchronization information frame including at least a part of information in the synchronization information frame received from said master terminal, from the synchronization information frame transmission start time defined by the synchronization information frame transmission start time information stored in the synchronization information transmission start time storing section, after detecting the missing of the synchronization information frame; and awaiting for a synchronization information frame from one of said plurality of network terminals whose synchronization information transmission start time is earlier than the synchronization information transmission start time of said network terminal, until the synchronization information frame transmission start time of said network terminal comes.

With the above, when a synchronization information frame is not supplied from the master terminal and hence the missing of the synchronization information frame is detected, a network terminal constituting the network system starts, as a new master terminal of the network system, to periodically output a synchronization information frame from a synchronization information frame transmission start time defined to be different from those of other network terminals. Note that, the synchronization information frame transmission start time is, for instance, defined by information (synchronization information frame transmission start time information) indicating a time elapsed from the detection of the missing of the synchronization information frame and a priority of the network terminal for a master terminal.

Thus, when the master terminal ceases activity and hence the synchronization information frame therefrom is no longer supplied, the network terminal awaits a synchronization information frame until the synchronization information transmission start time of the network terminal itself comes. If, before the synchronization information transmission start time comes, the network terminal cannot receive a synchronization information frame from another network terminal which is newly designated as a master terminal, the network terminal starts to operate as a master terminal and transmit a synchronization information frame to the other network terminals.

Note that, the network terminals are arranged in advance to have different synchronization information frame transmission start times. For this reason, even if the master terminal suddenly ceases activity, one of the remaining network terminals is designated as a new master terminal and hence the network is recovered.

When, as a master terminal, the network terminal transmits a synchronization information frame, the network terminal causes at least a part of information included in the synchronization information frame received from the previous master terminal to be included in the synchronization information frame.

With this, after a failure occurs in the previous master terminal, the information (e.g. network management information), which was managed by the previous master terminal and was outputted as a part of the synchronization information frame, is handed over to the new master terminal, and outputted as a part of the synchronization information frame from the new master terminal. In short, information is handed over from the master terminal before the failure to the master terminal after the failure.

Thus, when the network is recovered by designating a new master terminal after a failure occurs in the previous master terminal, it is unnecessary to carry out a process of setting the participation of network terminals to the network and the guarantee of bands for the terminals, i.e. it is unnecessary to carry out a process of recovering the network. For this reason, the data transport between the network terminal before the failure of the master terminal is promptly resumed.

In this manner, the above-described network terminal realizes the following: even if the synchronization information frame from the master terminal misses without a process of allowing a network terminal to takeover the role of the master terminal being performed, the transmission of a synchronization information frame is started in accordance with synchronization information frame transmission start times which have been stored in the respective network terminals in advance, in the order of synchronization information frame transmission start times, a network terminal having the earliest synchronization information frame transmission start time transmits a synchronization information frame first. On this account, the network is swiftly recovered.

Concerning the synchronization information frame transmission start time information, on condition that the network terminals have different synchronization information frame transmission start times, it is possible to determine a new master terminal without more than one network terminal simultaneously transmitting the synchronization information frames, as master terminals. Moreover, when the synchronization information frame transmission start time information includes the synchronization information frame transmission start times of all of the network terminals in the network system, i.e. when each network terminal knows the synchronization information frame transmission start times of all of the remaining network terminals, it is possible to establish the synchronization using the synchronization information frame including the previous network management information, even when there is a master terminal of another network in, for instance, another channel or even when a network terminal which did not exist in the network acts as a new master terminal and transmits a synchronization information frame.

To achieve the above-identified objective, the network system of the present invention is characterized by including a plurality of the above-described network terminals.

With this, even if the synchronization information frame from the master terminal misses due to a failure occurring in the master terminal, the transmission of a synchronization information frame is started in the order of synchronization information frame transmission start times, a network terminal having the earliest synchronization information frame transmission start time transmits a synchronization information frame first. On this account, the network is swiftly recovered.

Thus, it is possible to realize a network terminal which can shorten a period of no interaction between network terminals when a master terminal administering the network becomes not able to transmit a synchronization information frame.

A program of the present invention causes a computer to function as the sections of the above-described network terminal.

On this account, the users can acquire the above-described network terminal by downloading the foregoing program to one's computer system.

For a fuller understanding of the nature and advantages of the invention, reference should be made to the ensuing detailed description taken in conjunction with the accompanying drawings.

BRIEF DESCRIPTION OF THE DRAWINGS

FIG. 6 illustrates a data format of terminal information of the network terminal of FIG. 1, which is used on the occasion of generating the priority list.

FIG. 7 illustrates an example of master terminal priorities calculated using the terminal information on the occasion of generating the priority list in the network terminal of FIG. 1.

FIG. 8 illustrates an example of master terminal priorities calculated using the terminal information on the occasion of generating the priority list in the network terminal of FIG. 1.

FIG. 9 illustrates an example of the priority list of the network terminal of FIG. 1.

DESCRIPTION OF THE EMBODIMENTS

The following will describe an embodiment of the present invention with reference to FIGS. 1-14.

Figure 10:
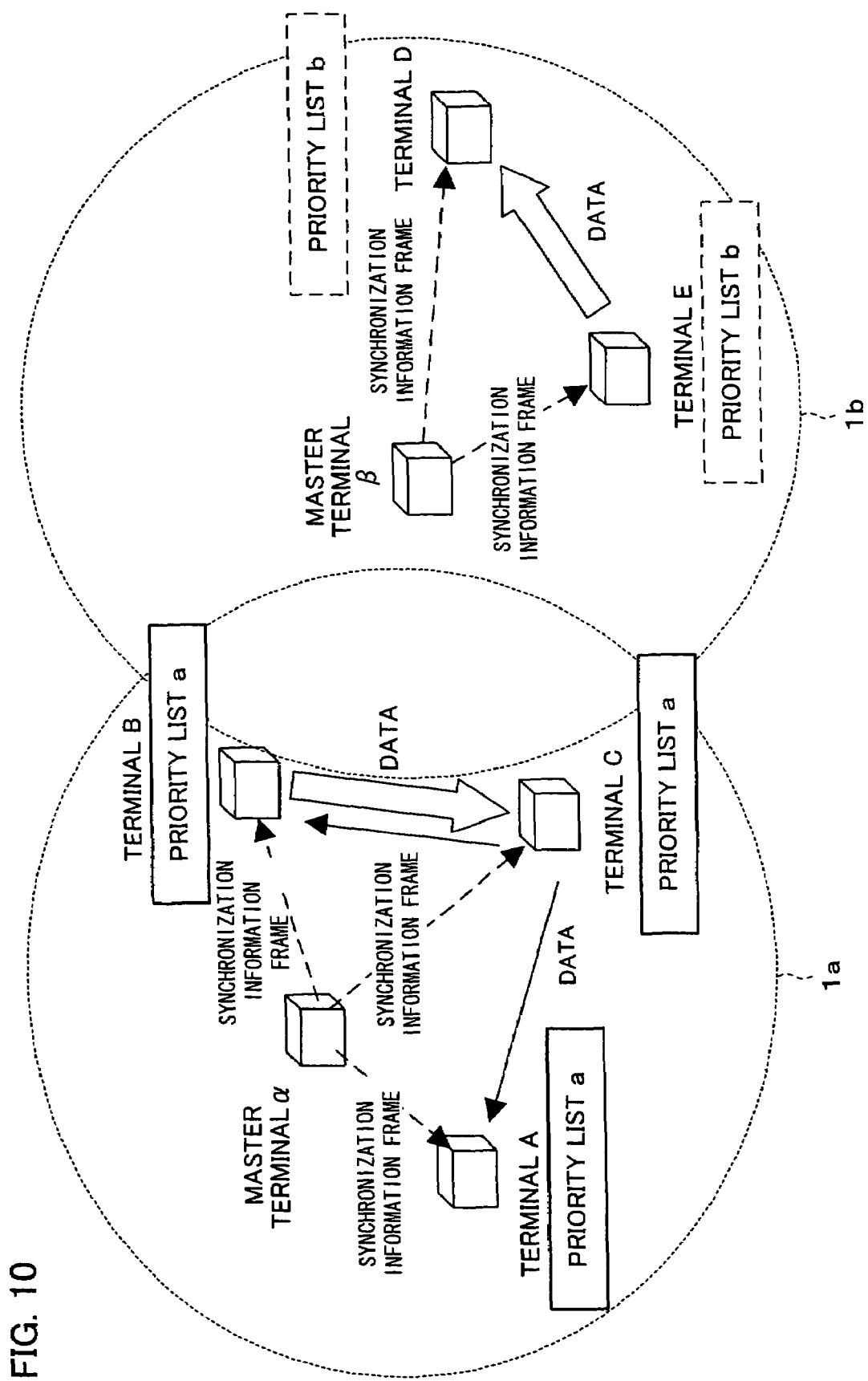
FIG. 10 schematically shows a network system made up of the network terminals of FIG. 1.

As FIG. 10 shows, a network system 1(1*a*, 1*b*) of the present embodiment is made up of a plurality of network terminals 10 which can transmit and receive data, and the transmission and reception between the terminals is administered in accordance with a synchronization information frame periodically supplied from a network terminal 10 which operates as a master terminal. Note that, a fundamental structure for managing a network by a synchronization information frame supplied from a master terminal has been disclosed by a prior art. On this account, the description of the fundamental structure may be omitted in some cases.

Figure 1:
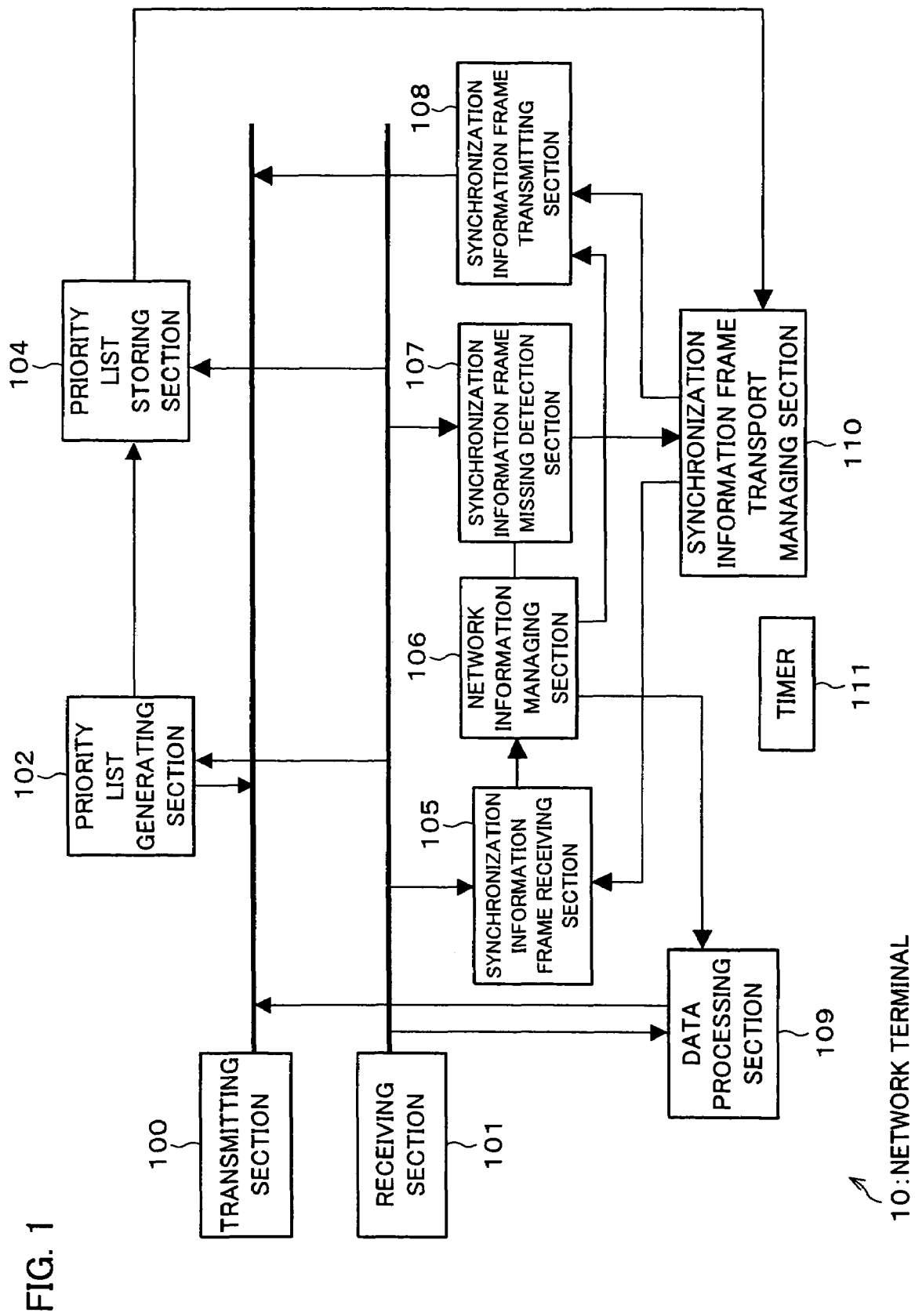
FIG. 1 is a functional block diagram schematically illustrating a network terminal of an embodiment of the present invention.

FIG. 1 is a block diagram schematically showing the network terminal 10.

As shown in FIG. 1, the network terminal 10 includes a transmitting section 100, receiving section 101, priority list generating section 102, priority list storing section 104, synchronization information frame receiving section 105, network information managing section 106, synchronization information frame missing detection section 107, synchronization information frame transmitting section 108, data processing section 109, synchronization information frame transport managing section 110, and timer 111.

The transmitting section 100 transmits a command, data, and so forth to another network terminal. The receiving section 101 receives a command, data, and so forth from another network terminal.

When the network terminal 10 including the below-mentioned priority list generating section 102 (hereinafter, such a network terminal 10 will be referred to as concerned network terminal 10) is designated as the master terminal, the priority list generating section (synchronization information frame transmission start time information generating means) 102 determines priorities (synchronization information frame transmission start time information) of the other network terminals 10 constituting the network system 1, generates a priority list, and transmits this priority list to the other network terminals 10. When the concerned network terminal 10 is the master terminal, the priority list generating section 102 determines the priorities of the other network terminals 10 in reference to, for instance, the capabilities of these network terminals 10 as a master terminal of the network system, and priorities of data transmitted from the network terminals 10.

The priority list indicates the priorities of the network terminals 10 in the network system, for selecting the master terminal. Note that, the priority list storing section 104 of each network terminal 10 can store either a priority list indicating the priorities of all of the remaining network terminals 10 or a priority list indicating only the priority of that network terminal 10.

The priority list storing section (synchronization information frame transmission start time storing means) 104 stores a priority list which is either generated by the priority list generating section 102 or received by the receiving section 101. More specifically, the priority list storing section 104 stores a priority list (synchronization information frame transmission start time information) for setting a time to start transmitting a synchronization information frame, in such a manner as to differentiate the time from start times of the remaining network terminals 10.

The synchronization information frame receiving section (synchronization information frame receiving means) 105 receives and processes the synchronization information frame which is supplied from the master terminal to the receiving section 101.

The network information managing section (network information managing means) 106 is synchronized with the synchronization information frame received by the synchronization information frame receiving section 105, so as to maintain the network. In other words, the network information managing section 106 manages the information regarding the synchronization to the network.

The synchronization information frame missing detection section (synchronization information frame missing detection means) 107 detects that the synchronization information frame which is supposed to be supplied from the master terminal misses, when the synchronization information frame receiving section 105 does not receive the synchronization information frame.

The synchronization information frame transmitting section (synchronization information frame transmitting means) 108 transmits the synchronization information frame. In particular, after the synchronization information frame missing detection section 107 detects that the synchronization information frame which is supposed to be supplied from the master terminal misses, the synchronization information frame transmitting section 108 starts, as a new master terminal of the network system, to periodically transmit a synchronization information frame from a synchronization information frame transmission start time determined by the synchronization information frame transport managing section 110 with reference to the priority list stored in the priority list storing section 104.

More specifically, with reference to the priority list in the priority list storing section 104, the synchronization information frame transmitting section 108 determines the synchronization information frame transmission start time with reference to a time which is figured out by multiplying the priority of the concerned terminal by a predetermined unit time. That is to say, the synchronization information frame transmission start time is determined in such a manner as to allow the concerned network terminal 10 to receive a synchronization information frame supplied from a slave network terminal 10 which has high-priority and acts as a master terminal, until the synchronization information frame transmission start time comes.

When the concerned network terminal 10 is the master terminal, the synchronization information frame transmitting section 108 generates a synchronization information frame so as to include, in the frame, at least a part of the information in the synchronization information supplied from the previous master terminal. Note that, the information in a synchronization information frame supplied from the reference is stored in the network information managing section 106.

If the synchronization information frame transmitting section 108 cannot generate a synchronization information frame and include, in the frame, at least a part of the information in the synchronization information supplied from the previous master terminal, which sets of information are included is determined in accordance with the priorities of sets of data which were transmitted between the network terminals 10.

The data processing section 109 exchanges data with another network terminal, and carries out a data processing in accordance with the result of the data exchange.

The synchronization information frame transport managing section 110 manages the transmitting and receiving of a synchronization information frame after the missing of the synchronization information frame is detected by the synchronization information frame missing detection section 107.

The timer 111 is a timer provided in the network terminal 10.

Figure 13:
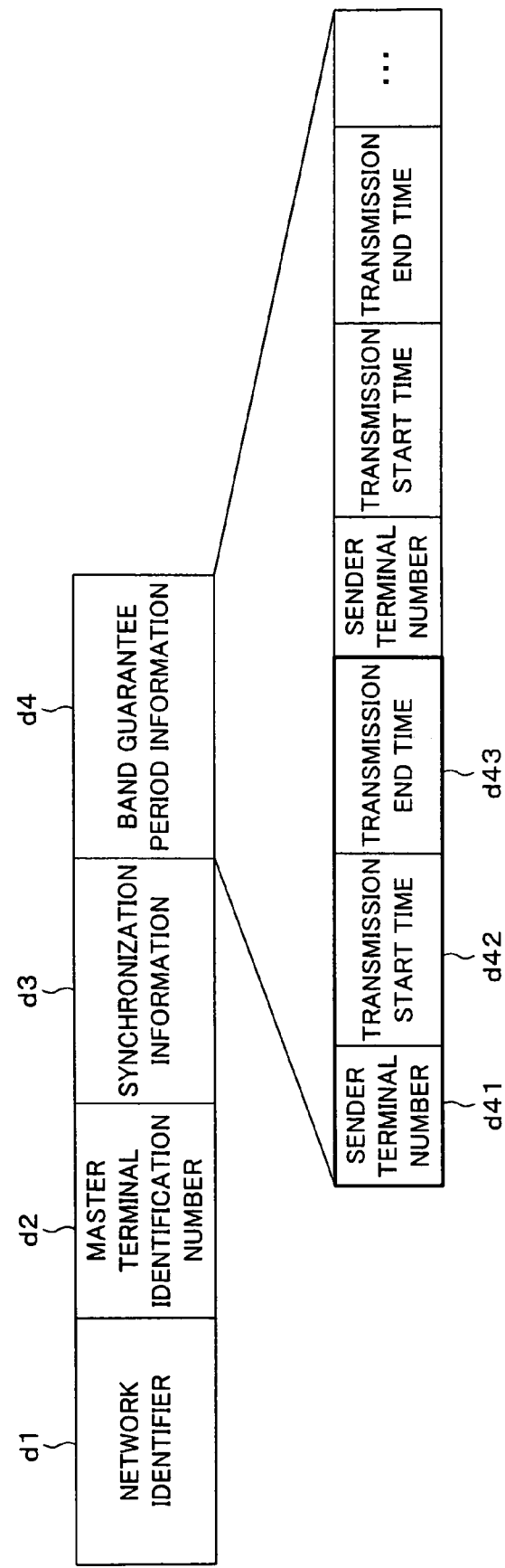
FIG. 13 shows an example of information included in a synchronization information frame.

Now, referring to FIG. 13, a frame format of the synchronization information frame used in the above-mentioned network terminal 10 is described. Note that, what is illustrated by FIG. 13 is an example of information included in the synchronization information frame.

As in the figure, the synchronization information frame includes a network identifier d1, master terminal identification number d2, synchronization information d3, and band guarantee period information d4.

The network identifier d1 is used for identifying a frame which is in the network administered by the same master terminal.

The master terminal identification number d2 is an identification number such as a MAC address represented by 6 bytes, which is used for discriminating the master terminal which transmits the synchronization information frame from the other network terminals.

The synchronization information d3 includes a transmission interval to the next synchronization information frame, a serial number of the synchronization information frame, and so on.

The band guarantee period information d4 is data constructed by listing, as one group, a sender terminal number d41, transmission start time d42, and transmission end time d43, in reference to a relative time which is determined on the assumption that either a time of transmitting the synchronization information frame or a time of receiving the synchronization information frame is 0.

Figure 14:
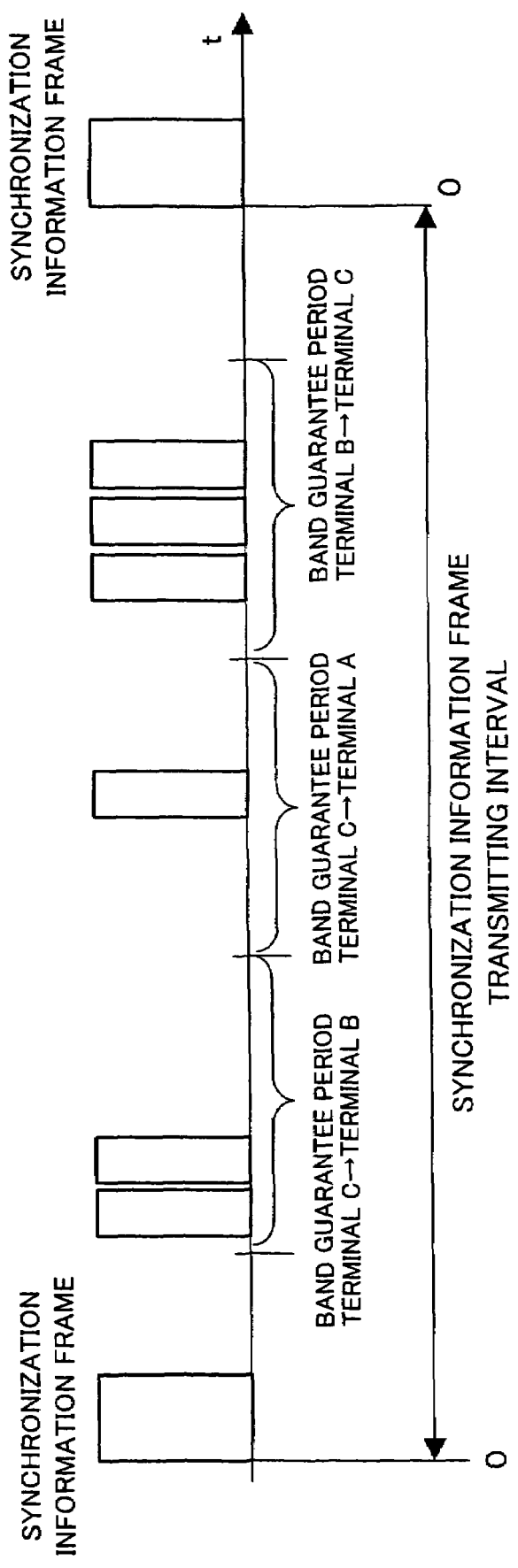
FIG. 14 illustrates how data transport is carried out in a band guarantee period between terminals of a specified network, in accordance with the synchronization information frame.
Figure 15:
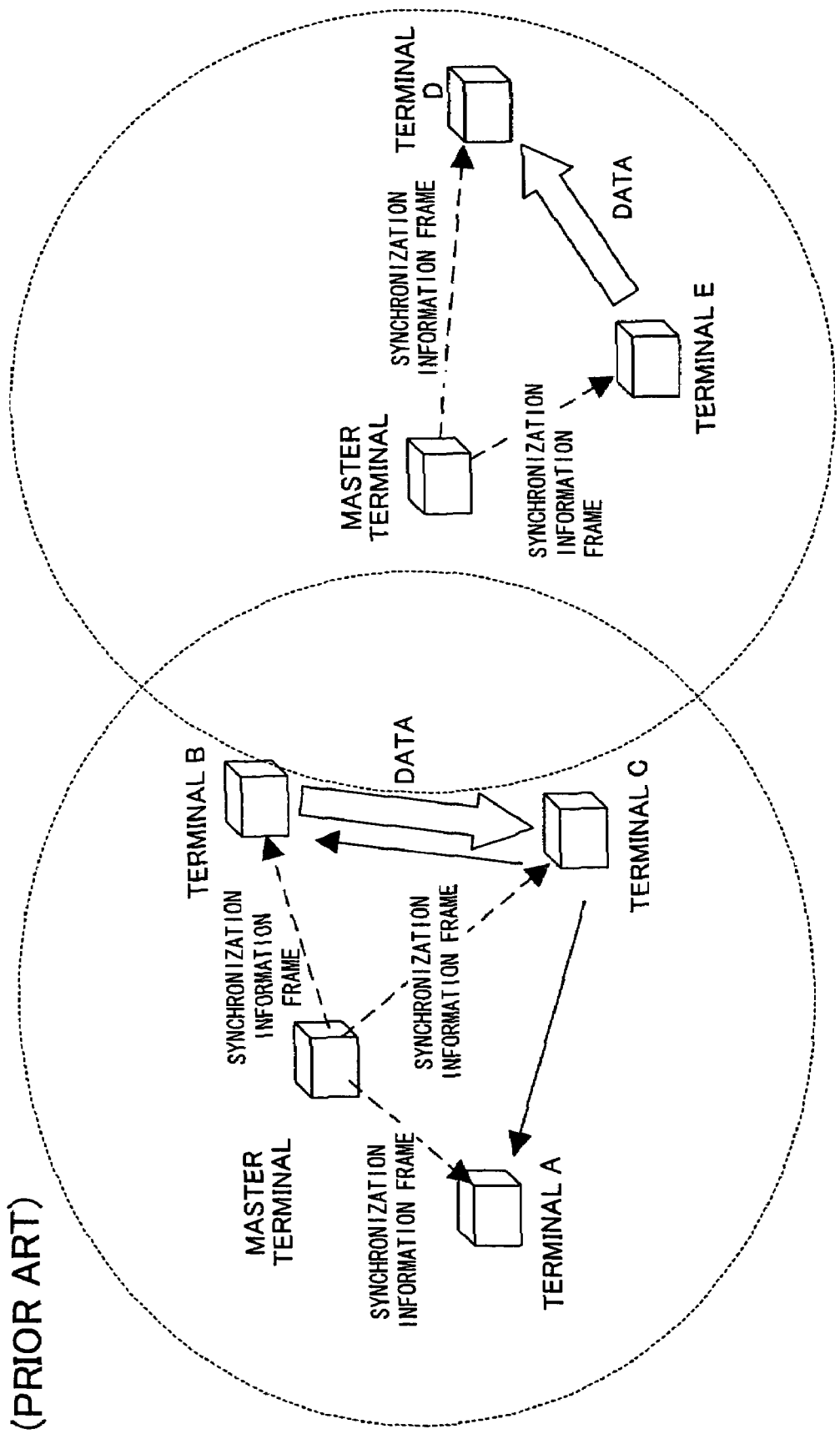
FIG. 15 schematically shows a conventional network system.
Figure 16:
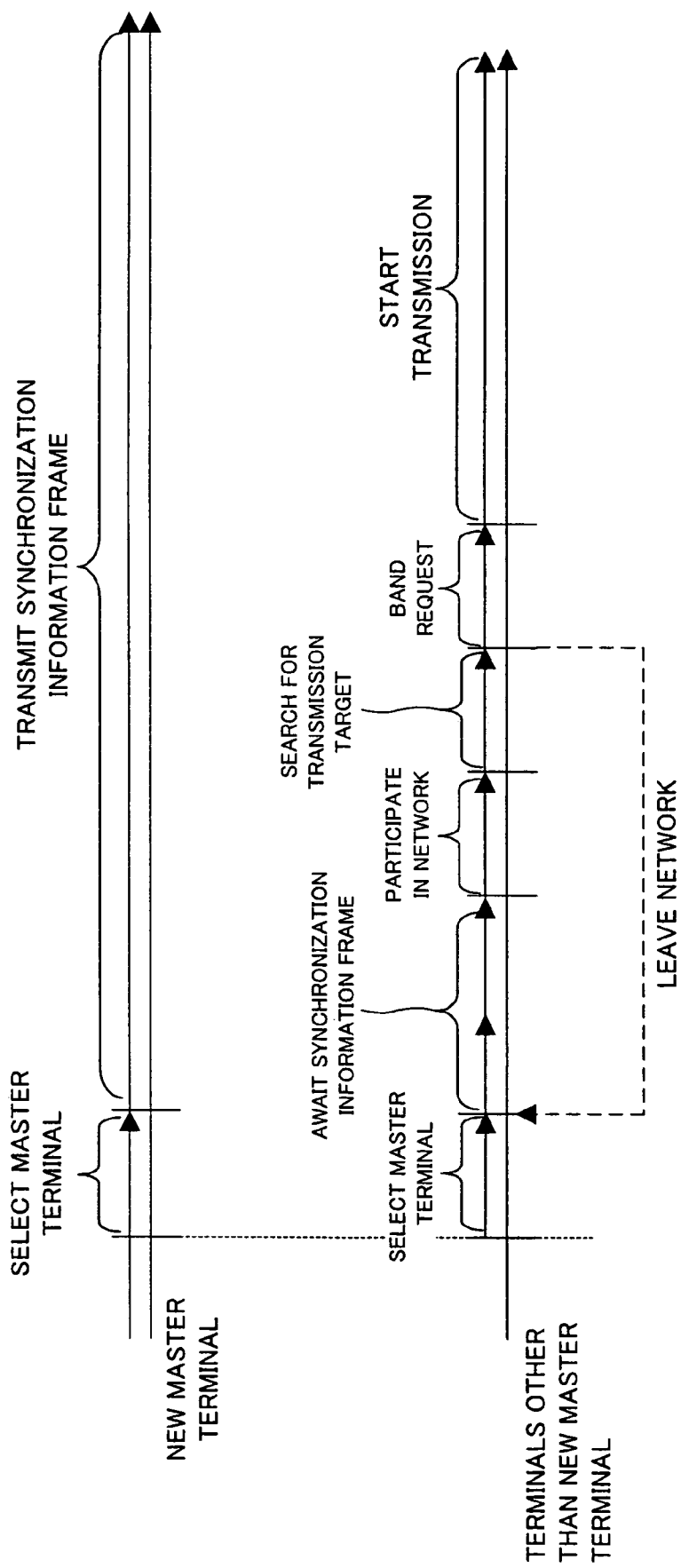
FIG. 16 illustrates how a transmission is resumed after the occurrence of a failure in a master terminal in the conventional network system.
Figure 17:
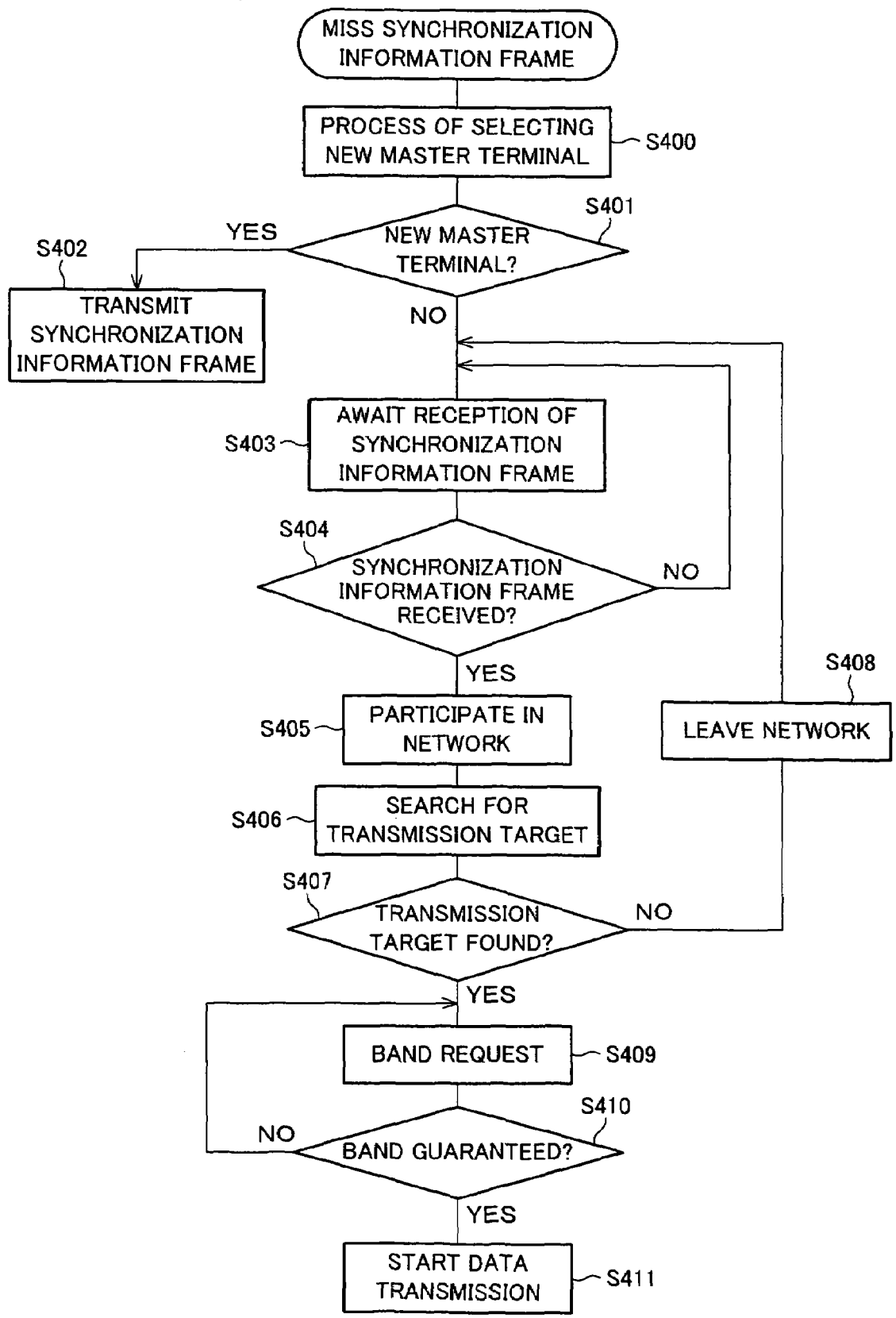
FIG. 17 is a flow chart showing a process of resuming the transmission after the occurrence of a failure in the master terminal in the conventional network system.

FIG. 14 illustrates how the communication in the network controlled in a time-division manner is carried out in accordance with the synchronization information frame, i.e. how data transport between network terminals in a specified network is carried out during a band guarantee period.

FIG. 9 illustrates a format of priority list data regarding the master terminal used in the above-mentioned communication between the network terminals 10.

As shown in FIG. 9, The priority list enumerates the identification numbers (e.g. 6-byte MAC address) of the network terminals 10, in accordance with the priorities.

Under normal conditions, the network terminal 10 operates as below.

(1) Master Terminal

When operating as a master terminal, the network terminal 10 generates a synchronization information frame (cf. FIG. 13) by the synchronization information frame transmitting section 108, with reference to network information stored in and managed by the network information managing section 106. Then the transmitting section 100 outputs the synchronization information frame when a value of the timer 111 indicates the next synchronization information frame transmitting time which is calculated from the previous synchronization information transmitting time and a synchronization information frame transmitting interval by the network information managing section 106.

(2) Network Terminal

When operating as a slave terminal, the network terminal 10 receives, by the receiving section 101, the synchronization information frame (cf. FIG. 13) which is periodically supplied from the master terminal, and by the synchronization information frame receiving section 105, determines whether or not the synchronization information frame is receivable, with reference to the network identifier or the master terminal identification number. If receivable, the synchronization information frame receiving time is updated to the value of the timer 111, and the network management information in the network information managing section 106 is updated with reference to network management information in the synchronization information frame, such as synchronization information and band guarantee period information.

Both on the occasion of operating as a master terminal and on the occasion of operating as a slave terminal, the network terminal 10 transmits and receives data in the following manner: The data processing section 109 compares (i) the transmission start time and transmission end time which are relative times included in band guarantee information managed by the network information managing section 106 with (ii) a relative time elapsed from the time of receiving the current synchronization information frame, the relative time being figured out by subtracting the time of receiving the current synchronization information frame from the value of the timer 111. If it is a band guarantee period of the concerned terminal and there is a command or data to be transmitted, the command or data is outputted from the transmitting section 100. Else, the data transmission and reception are carried out by accordingly processing the command or data to the concerned terminal, which is received by the receiving section 101.

Next, the following will discuss a process of generating and maintaining a priority list of a network terminal to be a new master terminal, when the master terminal is no longer able to transmit the synchronization information frame due to a failure.

Figure 3:
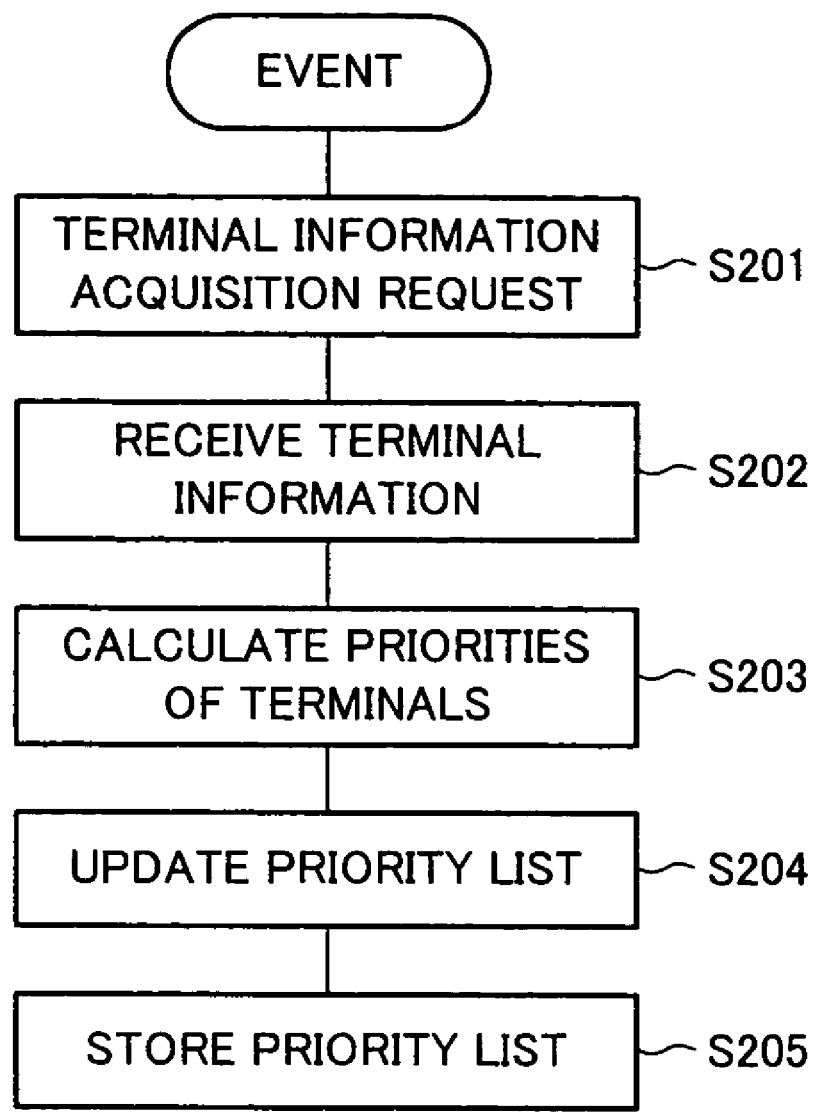
FIG. 3 is a flow chart showing a process of generating a priority list of the network terminal of FIG. 1.

Referring to FIG. 3, the process of generating the propriety list is described.

On the occurrence of an event, each network terminal 10 starts the priority list generating process by the priority list generating section 102. Any types of events will be regarded as this event, on condition that it occurs at one or more of the following timings: (i) at a certain interval; (ii) when a new network terminal participates in the network; (iii) when the existing network terminal leaves the network; and (iv) when a band guarantee period request is transmitted from a network terminal in the network.

First, the priority list generating section 102 transmits a terminal information acquisition request to the master terminal which manage and keep the information of all network terminals, some updated network terminals, or all of the network terminals in the network, in order to acquire information for generating the priority list, such as a master terminal function flag, the number of terminal manageable by the master terminal, and the number of the sets of band guarantee information manageable by the master terminal, as shown in FIG. 6 (S201).

Receiving the terminal information acquisition request, the other network terminals 10 transmit the terminal information acquisition request to the master terminal, and the sender network terminal receives, by the receiving section 101, the terminal information of the target network terminal. Alternatively, when the terminal information acquisition request is transmitted to the master terminal, the master terminal receiving the terminal information acquisition request transmits the terminal information regarding all of the network terminals in the network to the network terminal which has sent the terminal information acquisition request, so that this sender network terminal receives, by the receiving section 101, the terminal information regarding all of the network terminals (S202). After receiving the terminal information regarding all of the network terminals, priorities P(n) of the respective network terminals are calculated by a mathematical formula (1), a mathematical formula (2), and so forth (S203).

More specifically, the mathematical formula (1) is as follows.

$$P(n)=Mc(n)\times\{Nt(n)\times Ct+Nb(n)\times Cb\} \quad (1)$$

In this formula, $Mc(n)$ is a master terminal function flag, which is either 1 if a network terminal n can operate as a master terminal or 0 if the terminal n cannot operate as a master terminal. $Nt(n)$ is the maximum number of manageable network terminals when constructing a network, on the occasion that the network terminal n is selected as a master terminal. $Ct$ is a predetermined constant by which $Nt(n)$ is multiplied. $Nb(n)$ is the maximum number of manageable band guarantee periods when the network terminal is selected as a master terminal. $Cb$ is a predetermined constant by which $Nb(n)$ is multiplied.

For instance, when $Ct=1$ and $Cb=1000$ in the mathematical formula (1), the master terminal priorities are determined as in the table in FIG. 7. As the table shows, a network terminal having a larger number of manageable band guarantee periods has a higher priority.

Meanwhile, the mathematical formula (2) is as follows.

$$P(n)=Mc(n)\times\{Dp(n)\times Cp+Nt(n)\times Ct+Nb(n)\times Cb\} \quad (2)$$

In this formula, $Dp(n)$ is the maximum value of the priority of data which is currently transmitted by the network terminal n. For instance, a high priority is allocated to real-time video or audio data, while a low priority is allocated to other types of data. $Cp$ is a predetermined constant by which $Dp(n)$ is multiplied.

For instance, provided that $Cp=1000$, $Ct=1$, and $Cb=10$ in the mathematical formula (2), the master terminal priorities are determined as in the table in FIG. 8. As the table shows, a higher priority is allocated to a network terminal transmitting data having higher-priority.

Then in accordance with the calculated priorities P(n), the network terminal identifiers such as MAC address are listed in descending order of the priorities P(n), and consequently a priority list data shown in FIG. 9 is generated (S204).

Next, the priority list generating section 102 stores the generated priority list data in the priority list storing section 104 (S205). This is the end of the priority list generating process.

In this manner, under normal conditions of the network, each network terminal can store the latest priority list of the next master terminal, the priority list covering all of the network terminals constituting the network.

Figure 2:
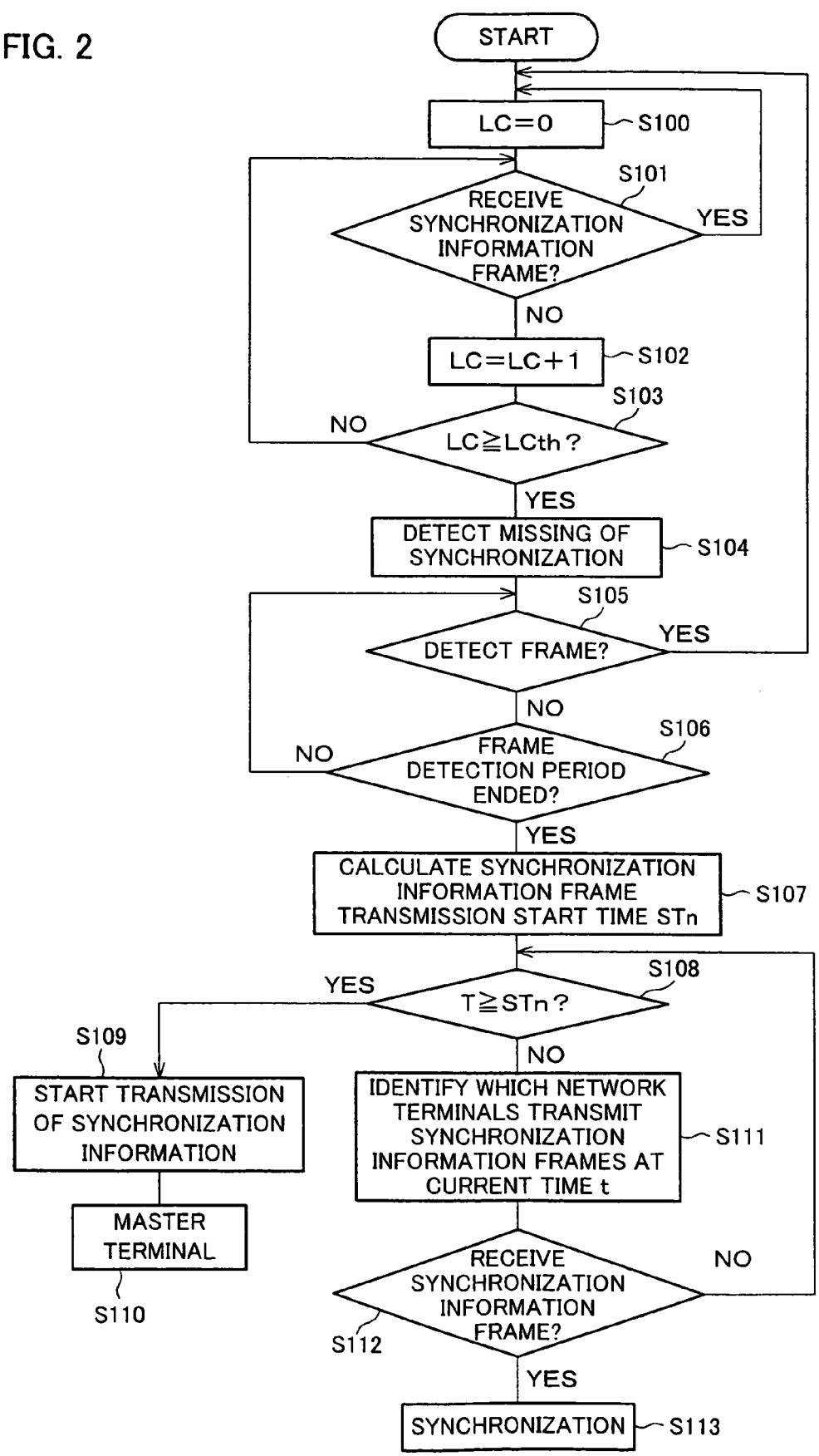
FIG. 2 is a flow chart showing a process carried out when a failure occurs in a master terminal of the network terminal of FIG. 1.
Figure 5:
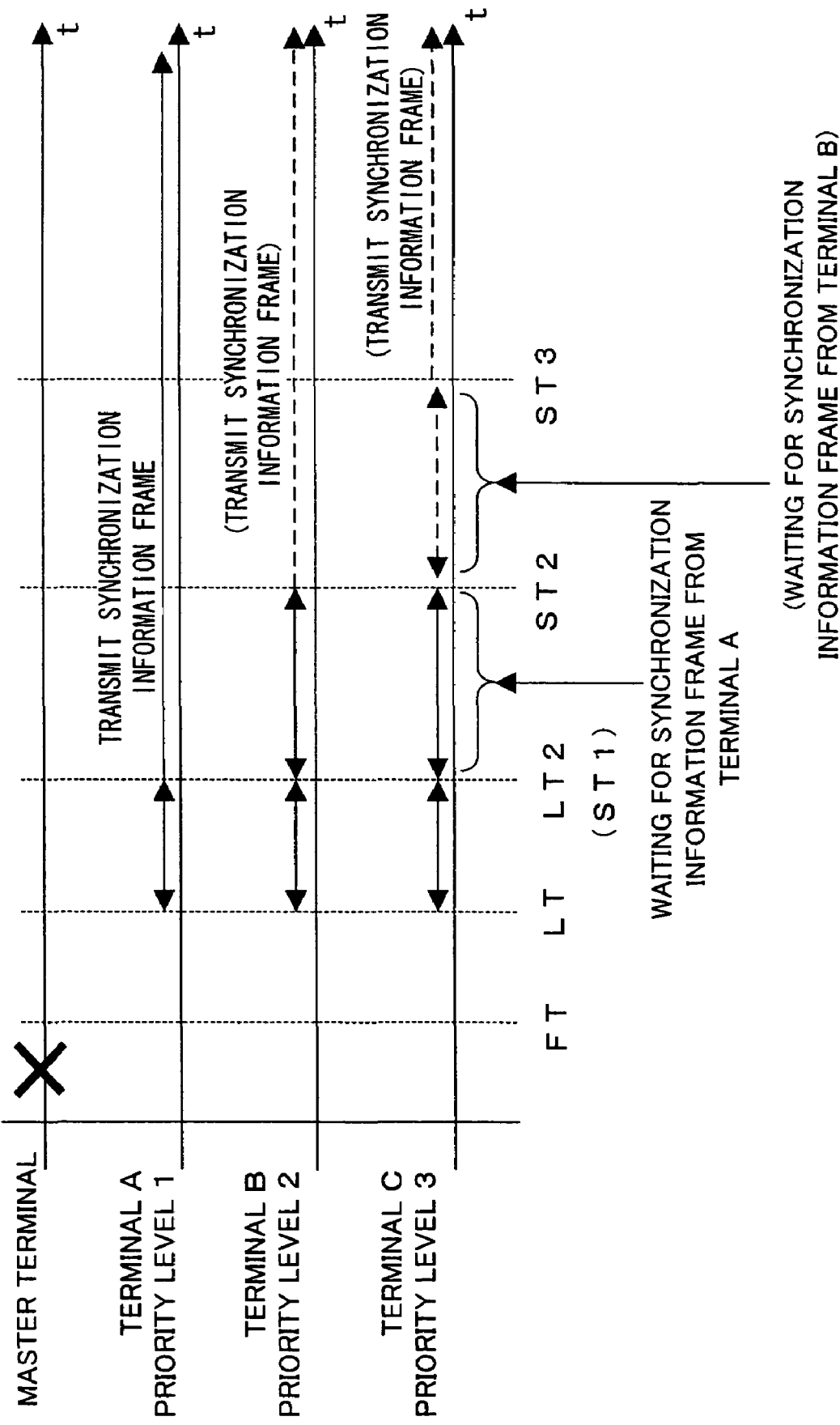
FIG. 5 illustrates a process carried out when a failure occurs in the master terminal of the network terminal of FIG. 1.

Next, referring to FIGS. 2, 5, 11 and 12, the following discusses the case where a master terminal which has been transmitting a synchronization information frame becomes incapable of transmission/reception of data including the synchronization information frame because of some kind of failure. FIG. 2 is a flow chart showing a process carried out by a network terminal when a failure occurs in the master terminal. FIG. 5 illustrates a process of each network terminal when a failure occurs in the master terminal of the network.

When the master terminal becomes incapable of transmission of the synchronization information frame due to a failure, each of the network terminal detect missing of the synchronization information frame by the synchronization information frame missing detection sections 107 in the following manner.

Firstly, in normal circumstance, a synchronization information frame missing counter LC is initialized so that it returns to 0 (S100). Next, at the incoming reception time calculated according to the synchronization information frame interval etc. included in the previous synchronization information frame, it is confirmed whether or not the synchronization information frame receiving section 105 has normally received the synchronization information frame (S101). If the synchronization information frame has been normally received (YES in S101) at the estimated reception time, the synchronization information frame missing counter LC returns to 0 to be ready for the next synchronization information frame. When the synchronization information frame has not been normally received (NO in S101) at the estimated reception time, 1 is added to the synchronization information frame missing counter LC (S102). This corresponds to the time FT shown in FIG. 5.

Then, it is determined that whether or not the updated synchronization information frame missing counter LC indicates a predetermined threshold LCth or a greater value (S103). When the LC indicates a value smaller than the LCth, (NO in S103), the value of the synchronization information frame interval of the previous synchronization information frame is added to the existing value for the next reception time of synchronization information frame so that the next reception time is updated. Then, the sequence returns to S101 to be ready for the next synchronization information frame. On the other hand, when the LC indicates a value equal to or greater than the LCth, (YES in S103), this is regarded some kind of failure of proper reception of the synchronization information frame, and is detected as missing of the synchronization information frame (S104: a step of detecting missing of synchronization information frame). This corresponds to the time LT shown in FIG. 5.

During a predetermined period after the detection of the missing of the synchronization information frame, the receiving section 101 fetches all receivable frames so as to detect the previous synchronization information frames before the detection of missing of the synchronization information frame (for example, the frame shown in FIG. 13) by finding the same network identifier as that of the previous synchronization information frame (S105, S106).

If a frame including a network identifier before the detection of missing of the synchronization information frame is successfully detected in this predetermined period (YES in S105), it indicates that the synchronization information frame has been received in other network terminals and the transmission/reception of data is carried on. Therefore, in this case, the sequence returns to the step S100 so as to reset the synchronization information frame missing counter LC to 0 to be ready for incoming synchronization information frame.

On the other hand, if no frame is detected in the predetermined period (YES in S106), it indicates that the other network terminals also detect the missing of synchronization information frame, and therefore the sequence goes to the step S107. Note that, the operations in the steps S105 and S106 are performed in a period from the time LT to the time LT2 of FIG. 5.

Next, the network terminal which has detected missing of synchronization information frame carries out the following operation instructed by the synchronization information frame transport managing section 110. First, the concerned network terminal calculates a synchronization information frame transmission start time STn for starting transmission of the synchronization information frame by using the priority list stored therein in accordance with the mathematical formula (3) below (S107).

$$STn = (\text{priority} - 1) \times Cs + LT2 \tag{3}$$

In the formula, Cs expresses a unit time that is equal to or greater than a predetermined multiple of the transmission interval of the synchronization information frame. For example, Cs=30 ms with respect to the transmission interval of the synchronization information frame=10 ms. Accordingly, the synchronization information frame transmission start time is found as: ST1=LT2, ST2=LT2+Cs, ST3=LT2+Cs×2 . . . , in the order of the priorities.

Next, the network terminal 10 branches the operation in accordance with the time T and the synchronization information frame transmission start time STn that is found based on the priority of the concerned network terminal.

In the step S108, if the current time T has passed the corresponding synchronization information frame transmission start time STn (YES in S108), the network information managing section 106, which manages network management information received from the previous master terminal, becomes a new master terminal and starts the transmission of the synchronization information frame (S109: a step of transmitting a synchronization information frame) by the synchronization information frame transmitting section 108 via the transmitting section 100, and then continuously carries out operation as the master terminal (S110). For example, as shown in FIG. 5, the terminal A in the first priority level immediately starts transmission of the synchronization information frame under condition of ST1=LT2.

On the other hand, if the current time T has not passed the corresponding synchronization information frame transmission start time STn in the step S108 (NO in S108), it indicates that one of the other network terminals higher in priority carries out transmission of the synchronization information frames. Therefore, the network terminal refers to the time T so as to find out which of the network terminals carries out transmission of the synchronization information frames (S111). For example, the case where ST1<T<ST2 means that the network terminal in the first priority level carries out the transmission of synchronization information frame. Further, the case where ST2<T<ST3 means that the network terminal in the second priority level carries out the transmission of synchronization information frame.

Next process is branched out depending on whether or not the synchronization information frame receiving section 105 receives the synchronization information frame from the new master terminal (S112). The judgment of the synchronization information frame from the new master terminal is performed as follows. Specifically, by referring to i) which of the network terminals transmits the synchronization information frame at the current time, which is found out in the step S111, ii) the terminal ID number included in the priority list, and iii) the mater terminal ID number included in the synchronization information frame (FIG. 13) transmitted form the new master terminal in the current time, it is possible to confirm that the synchronization information frame received at the time T is transmitted not from the other master terminal but from the new master terminal determined through the foregoing operations.

Next, after reception of the synchronization information frame from the new master terminal (YES in S112), the information stored in the network information managing section 106 is updated according to the synchronization information frame, and again starts the synchronization as a network terminal (S113). On the other hand, when the synchronization information frame from the new master terminal is not received (NO in S112), the sequence returns to the step S108 so as to operate as a master terminal or to continue operation until synchronization with the new master terminal is established.

Figure 11:
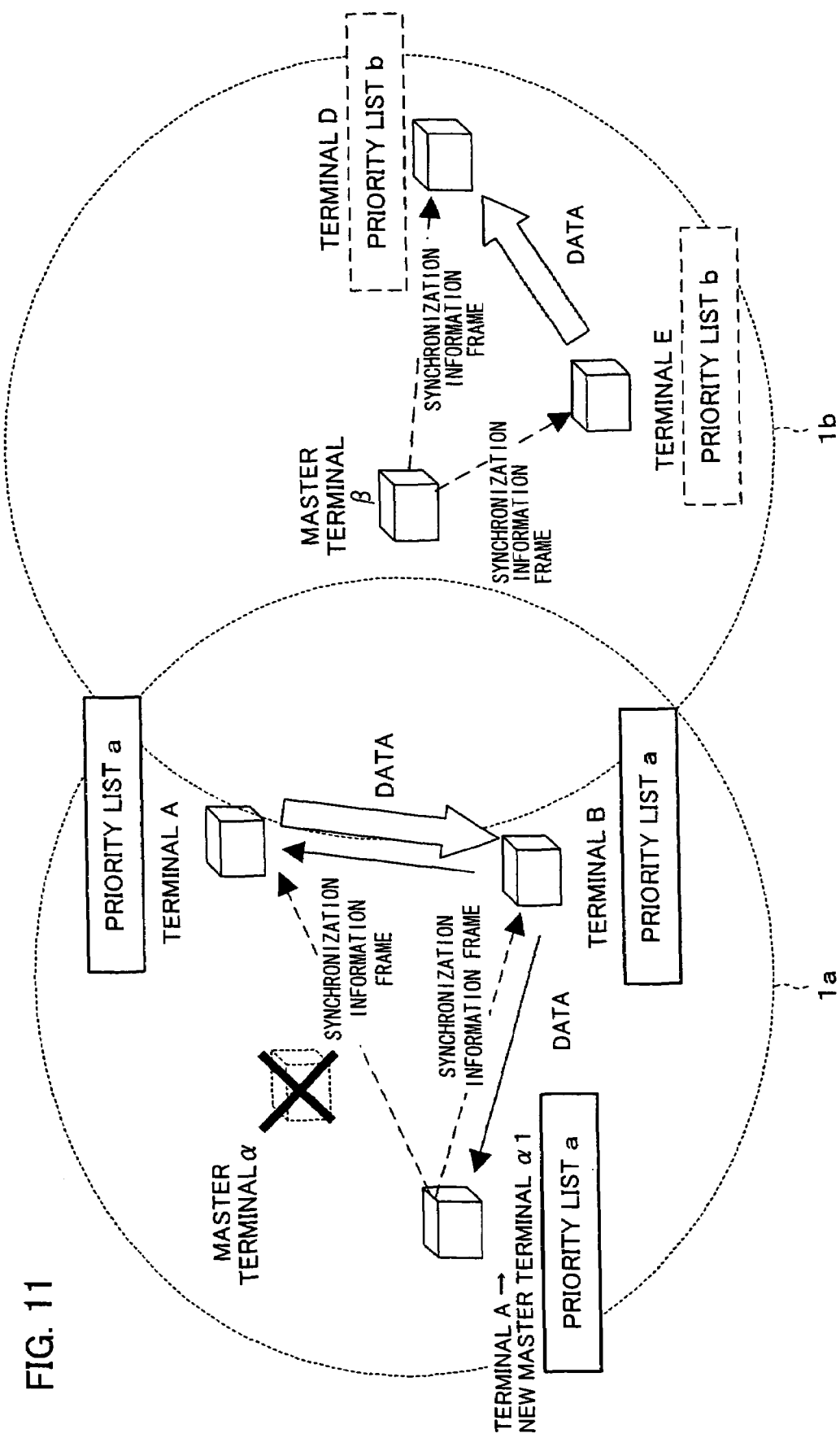
FIG. 11 illustrates an operation of the network system of FIG. 10, when a failure occurs in the master terminal.

Here, as shown in FIG. 11, when the master terminal α in the network system 1a becomes incapable of transmission of synchronization information frame because of some kind of failure, the terminal A operates as a new master terminal α1 and start transmission of the synchronization information frame. Then, as the terminal B and the terminal C receive the synchronization information frame from the new master terminal A, the data transmission interrupted by the failure is recovered in the network.

Figure 12:
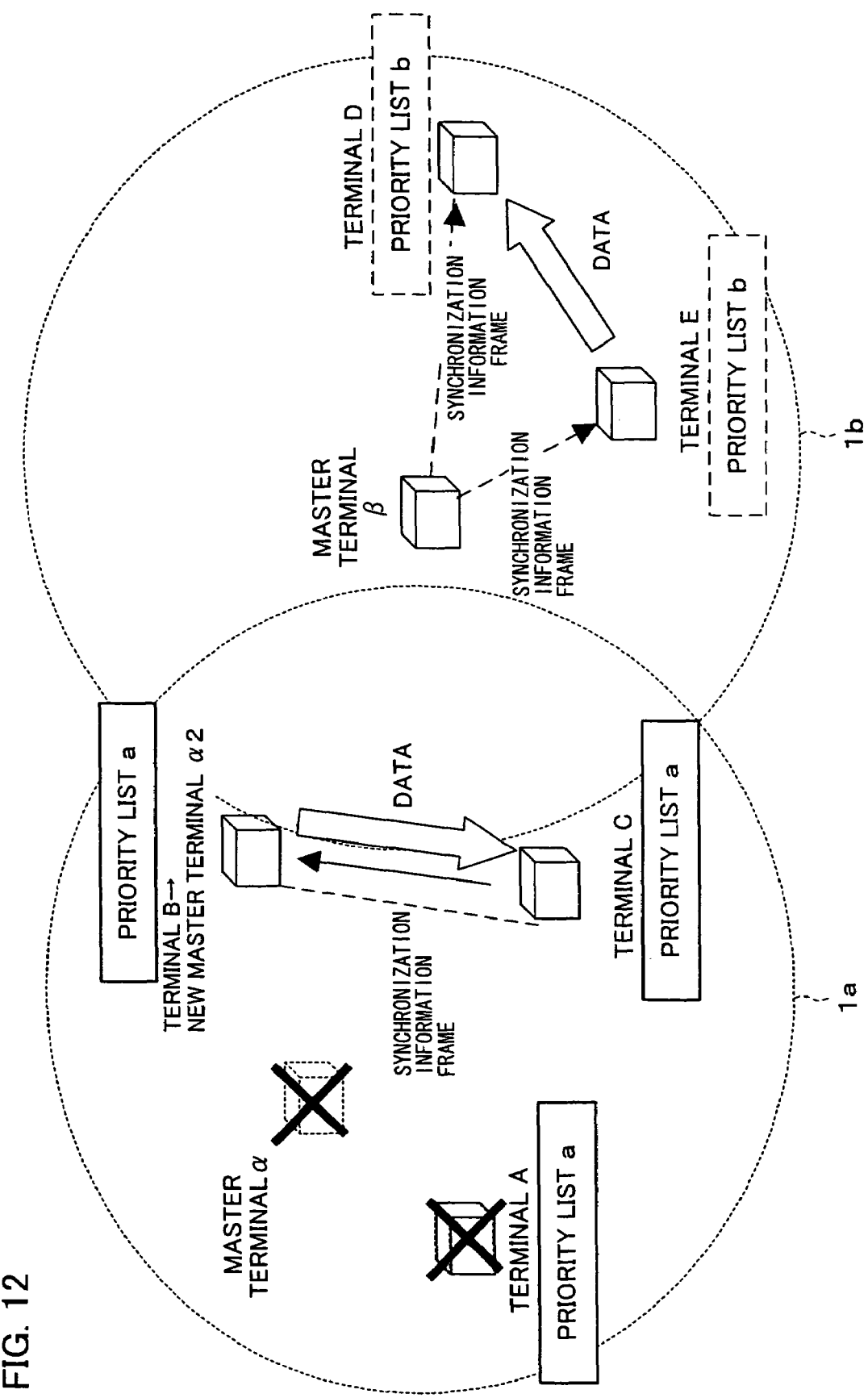
FIG. 12 illustrates an operation of the network system of FIG. 10, when a failure occurs in the master terminal.

Further, as shown in FIG. 12, when failure occurs simultaneously in the master terminal α and the terminal A in the network system 1a, the terminal A, which is in the first priority level and therefore is supposed to transmit the synchronization information frame at the time ST1 to the time ST2 shown in FIG. 5, becomes also incapable of transmission of synchronization information frame due to the failure, and therefore the terminal B and the terminal C which are in the second priority level or lower cannot receive the synchronization information frame to establish synchronization. Then after the time ST2 has passed, the terminal B in the second priority level according to the priority list a starts transmission of the synchronization information frame as a new master terminal α2. This allows the terminal C to be synchronized with the synchronization information frame transmitted from the terminal B, thus carrying out data transmission between the terminal B and the terminal C.

Note that, the synchronization information frame transmitted form the new master terminal includes all of the network management information which had been managed by the old master terminal until the failure occurred. The network management information contain such as information regarding network terminals constituting the network, and band guarantee period information.

As described, under normal circumstance, the respective network terminals store the priority list for the next master terminal, which list is constituted of the all terminals in the network; and when the master terminal becomes incapable of transmitting the synchronization information frame due to some kind of failure, transmission and reception of the synchronization information frame including the whole or a part of the synchronization information before the failure occurred is carried out according to the priority list stored in the respective network terminals. This function allows immediate re-establishment of the network interrupted by the failure of the old master terminal, thus immediately resuming the data transmission in the network.

By selecting the information to determine the priorities, it is possible to rank the terminals in the order of their network administration abilities, thus maintaining the same network structure. Further, the priorities of the terminals to be the master terminal may depend upon the content of the data transmission. With this arrangement, it is possible to give priorities to more important data transmission upon re-establishment.

Figure 4:
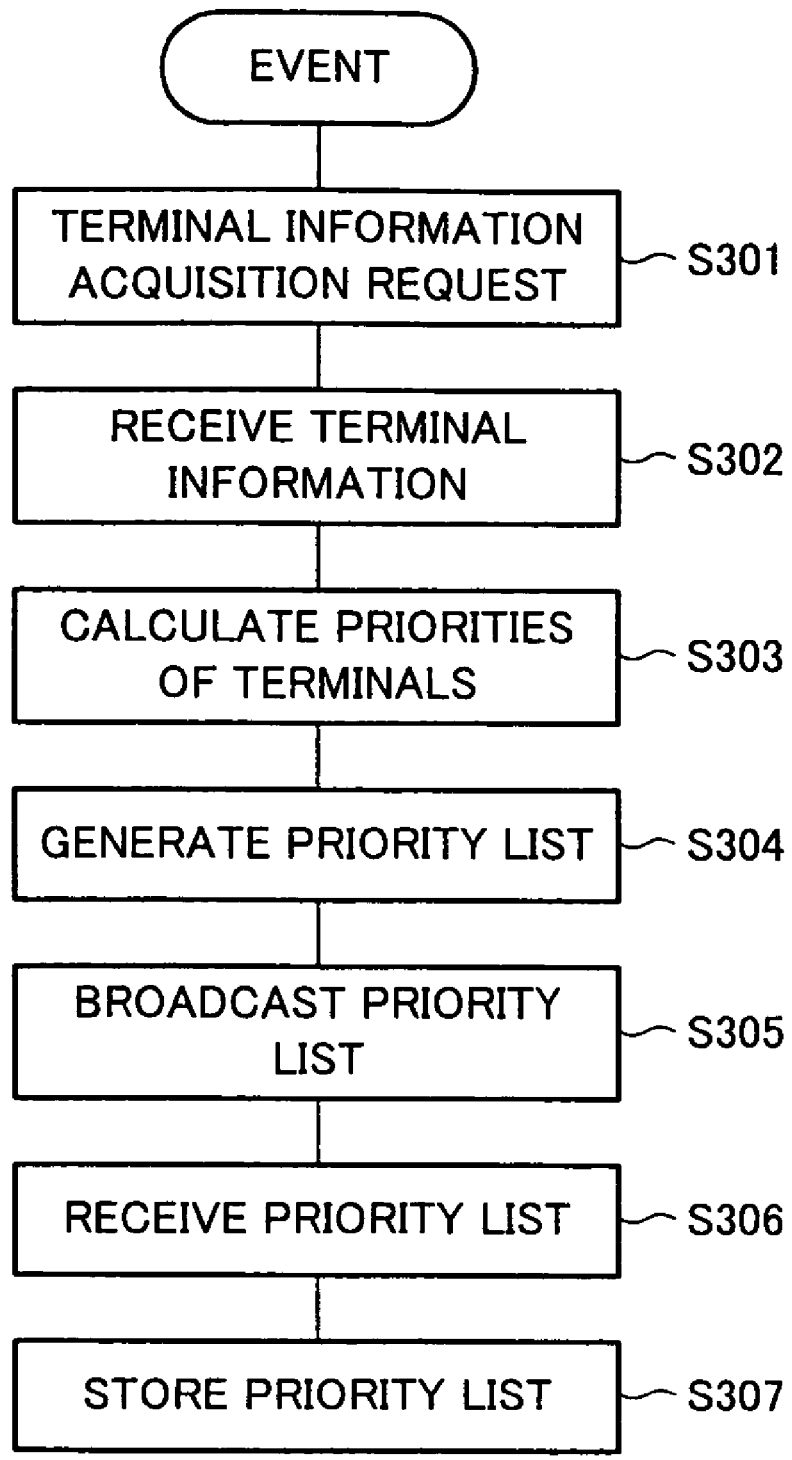
FIG. 4 is a flow chart showing a process of acquiring a priority list of the network terminal of FIG. 1.

Next, with reference to FIG. 4, the following describes other operation flows in each network terminal 10 from generation of the priority list to storing of the list.

Upon occurrence of an event, the master terminal starts the priority list generating process by the priority list generating section 102. As with FIG. 3, Any types of events will be regarded as this event, on condition that it occurs at one or more of the following timings: (i) at a certain interval; (ii) when a new network terminal participates in the network; (iii) when the existing network terminal leaves the network; and (iv) when a band guarantee period request is transmitted from a network terminal in the network.

First, the priority list generating section 102 of the master terminal transmits a terminal information acquisition request from the sending section 100 to all network terminals or some updated network terminals, in order to acquire information for generating the priority list (S301).

Receiving the terminal information acquisition request, the network terminals 10 transmits the terminal information acquisition request to the master terminal, and the master terminal receives, by the receiving section 101, the terminal information of the target network terminal (S302).

After receiving the terminal information regarding all of the network terminals, the master terminal calculates priorities $P(n)$ of the respective network terminals by a mathematical formula (1), a mathematical formula (2), and so forth (S303).

Then in accordance with the calculated priorities $P(n)$, the network terminal identifiers such as MAC address are listed in descending order of the priorities $P(n)$, and consequently a priority list data shown in FIG. 9 is generated (S304).

Next, the priority list generating section 102 of the master terminal broadcasts the generated priority list data to the all network terminals in the network via the transmitting section 100 (S305).

Each of the network terminals other than the master terminal receives the broadcasted priority list data by the receiving section 101 (S306), and stores the list in the priority list storing section 104 (S307). This is the end of the operation.

With such a manner, the master terminal managing the network carries out generation of priority list and broadcasting of the list to the other network terminals. This allows generation of a unique priority list, thus reducing such a defect that the priority lists in the respective network terminals differ from one another depending on the timing.

Next, the following describes other characteristics of the synchronization information frame transmitted from the new master terminal.

If the synchronization information frame transmitted from the new master terminal misses out some sets of the network management information of the old master terminal; in other words, if the new master terminal has a lower ability than that of the old master terminal, some sets of the information have to be deleted from the new synchronization information frame. The network terminal 10 selects the information to be deleted in the following manner.

When the new master terminal can manage less number of network terminals than the old master terminal, the network terminal 10 picks out, for example, a network terminal joined in the network but carrying out no data transport with other terminals, a network terminal carrying out data transmission with a small number of bands, a terminal network with a shorter band guarantee period, or a network terminal transmitting less important data, so as to sequentially delete these terminals from the network management information so that they are excluded from the synchronization information frame.

Further, when the new master terminal can manage less amount of band guarantee period information than the old master terminal, the network terminal 10 picks out, for example, a terminal network with a shorter band guarantee period, or a network terminal transmitting less important data, so as to sequentially delete these terminals from the network management information so that they are excluded from the synchronization information frame.

In this manner, even with the new master terminal having less information management ability than the old terminal, transmission of data regarded highly important can be recovered without taking the trouble to join the network again or to re-obtain the band even after the failure, by deleting some data from the synchronization information frame, according to the presence of data transmission or importance of the contents. Namely, by maximally containing information of the previous synchronization information into the new synchronization information frame, data transmission between the master terminal and the other terminals in the network can be recovered without taking the trouble to join the network again or to re-obtain the band.

The present invention is not limited to the embodiments above, but may be altered within the scope of the claims. Accordingly, the following structure examples are also encompassed in the technical scope of the present invention.

A network terminal of the present invention, constituting a network system which is made up of a plurality of network terminals being capable of transmitting and receiving data and manages transmitting and receiving of data in accordance with a synchronization information frame periodically supplied from one of said plurality of network terminals which operates as a master terminal, may comprise: priority list generating means for generating a priority list of a next master terminal of the network, in accordance with the priorities of the network terminals; a priority list storing means for storing the priority list generated by the priority list generating means; synchronization information frame missing detection means for detecting the missing of the synchronization information frame from the master terminal; synchronization information frame receiving means for receiving a synchronization information frame supplied from a network terminal which has a higher priority than said network terminal, from a synchronization information frame missing detection time to a synchronization information frame transmission start time figured out in reference to the priority list; network information managing means for managing the network by being synchronized with the synchronization information frame received by the synchronization information frame receiving means; synchronization information frame transmitting means for periodically outputting a synchronization information frame including at least a part of information in the synchronization information frame received from said master terminal, from the synchronization information frame transmission start time; and synchronization information frame transport managing means for managing the times of receiving and transmitting the synchronization information frame, after the synchronization information frame missing detection means detects the missing of the synchronization information frame.

With this, the following is carried out: Even if, without the role of the master terminal being handed over to another network terminal, the network terminal is no longer able to receive the synchronization information frame from the master terminal due to a failure therein, the transmission of the synchronization information frame including the information which was managed by the previous master terminal is carried out in accordance with the priority list generated in advance and kept in each network terminal. The transmission starts at a predetermined time and sequentially carried out in the order of the priorities in accordance with the priority list, each of the other network terminals receives and is synchronized with the synchronization information frame supplied from the known network, for a predetermined period of time. In this manner, it is possible to omit the process of recovering the network, and thus the network before the occurrence of the failure is swiftly recovered.

According to the above-described network terminal, the network terminals other than the master terminal obtain the priority list from the master terminal, the priority list being generated by the priority list generating means of the master terminal.

Moreover, in the above-described network terminal, the priority list generating means generates the priority list in accordance with the capabilities of the network terminals as a master terminal. That is to say, the priority list may be generated in accordance with the capabilities of the network terminals as a master terminal, examples of the capabilities being such that the number of manageable network terminals and a capability of managing bands for data transport between the network terminals.

Thus, according to the above-described network terminal, a network terminal which is the most suitable for managing the network is selected as a new master terminal. For this reason, it is possible to decrease the likelihood of a failure in the network, which is due to a newly-selected master terminal having managing capabilities different from those of the previous master terminal.

Furthermore, in the above-described network terminal, the priority list generating means generates the priority list in accordance with the priorities of the sets of data exchanged between the network terminals. That is to say, the priority list generated by the priority list generating means may be generated in accordance with the priorities of the sets of data exchanged between the network terminals.

Thus, according to the above-described network terminal, the priority list generated by the priority list generating means indicates that a network terminal transmitting a set of data having the highest priority is selected as a new master terminal. For this reason, it is possible to give priority to the resumption of data transport having a high priority.

Moreover, in reference to the priority list, the above-described network terminal starts to transmit the synchronization information frame from a synchronization information frame transmission start time which is figured out in such a manner that, to a predetermined time after the time of detecting the synchronization information frame missing detection means, a result of multiplying a priority by a unit time which is not less than a predetermined multiple of a synchronization information frame transmission interval is added. That is to say, the synchronization information frame transmission start time, from which the transmission from the synchronization information frame transmitting means starts and which is calculated in accordance with the priorities, may be a time figured out in such a manner that, to a time detected by the synchronization information frame missing detection means, a result of multiplying a priority by a unit time which is not less than a predetermined multiple of a synchronization information frame transmission interval is added.

Thus, according to the above-described network terminal, it is possible to prevent more than one network terminal from simultaneously starting to transmit synchronization information frames, and to figure out when each of the network terminals transmit a synchronization information frame. This makes it possible to clearly recognize a synchronization information frame transmitted from another master terminal.

Moreover, when designated as a new master terminal, the above-described network terminal selects a set of information to be included in a synchronization information frame, in accordance with the presence of data transport between the network terminals, the priorities of sets of data being exchanged, and so forth, when said network terminal has lower capabilities as a master terminal than the previous master terminal and thus cannot include information such as band guarantee period information. That is to say, in a case where the synchronization information frame transmitted by the synchronization information frame transmitting means cannot include all of the synchronization information and band management information which were supplied from the previous master terminal, information to be included may be selected in accordance with the priorities of the sets of data exchanged between the terminal networks.

With this, the above-described network terminal can give priority to the resumption of data transport having a high priority before the occurrence of the failure.

A network terminal of the present invention, constituting a network system which is made up of a plurality of network terminals being capable of transmitting and receiving data and manages transmitting and receiving of data in accordance with a synchronization information frame periodically supplied from one of said plurality of network terminals which operates as a master terminal, may comprise: synchronization information frame receiving means for receiving the synchronization information frame from said master terminal; network information managing means for managing the network by being synchronized with the synchronization information frame received by the synchronization information frame receiving means; synchronization information frame missing detection means for detecting a missing of the synchronization information frame from said master terminal, when the synchronization information frame receiving means does not receive the synchronization information frame; synchronization information transmission start time storing means for storing synchronization information frame transmission start time information which defines a synchronization information frame transmission start time in such a manner as to cause said network terminal to have a synchronization information frame transmission start time different from synchronization information frame transmission start times of the other network terminals; and synchronization information frame transmitting means for, in a case where said network terminal acts as a new master terminal of the network system, periodically outputting a synchronization information frame including at least a part of information in the synchronization information frame received from said master terminal, from the synchronization information frame transmission start time defined by the synchronization information frame transmission start time information stored in the synchronization information transmission start time storing means, synchronization information frame transmitting means starting to output the synchronization information frame after the synchronization information frame missing detection means detects the missing of the synchronization information frame.

A method of controlling a network terminal of the present invention, constituting a network system which is made up of a plurality of network terminals being capable of transmitting and receiving data and manages transmitting and receiving of data in accordance with a synchronization information frame periodically supplied from one of said plurality of network terminals which operates as a master terminal, may comprise the steps of: detecting a missing of the synchronization information frame from said master terminal, when the synchronization information frame is not supplied from said master terminal; in a case where said network terminal acts as a new master terminal of the network system, and periodically outputting a synchronization information frame including at least a part of information in the synchronization information frame received from said master terminal, from the synchronization information frame transmission start time defined by the synchronization information frame transmission start time information stored in the synchronization information transmission start time storing means, after detecting the missing of the synchronization information frame.

With the arrangement and method above, when the synchronization information frame is not supplied from the master terminal and hence the missing of the synchronization information frame is detected, a network terminal constituting the network system starts, as a new master terminal, to periodically supply a synchronization information frame, from a synchronization information frame transmission start time. Note that, the network terminals are arranged so as to have different synchronization information frame transmission start times, and a synchronization information frame transmission start time is defined by, for instance, a time elapsed from the time when the missing of the synchronization information frame is detected, and information (synchronization information frame transmission start time information) indicating a priority of the network terminal for a master terminal of the network system.

Thus, when the master terminal ceases activity and the synchronization information frame is no longer supplied therefrom, the network terminal awaits a synchronization information frame until the synchronization information frame transmission start time of the network terminal itself comes, and if, to the concerned network terminal, no network terminal as a master terminal supplies a synchronization information frame, the concerned network terminal takes over the role as a master terminal and supplies a synchronization information frame to the other network terminals.

Note that, the synchronization information frame transmission start times of the respective network terminals are arranged so as to be different from each other in advance. With this, even if the master terminal suddenly ceases activity, one of the remaining network terminals is designated as a new master terminal and hence the network is recovered. Moreover, on the occasion of recovering the network by selecting a new master terminal, it is unnecessary to check the connections between the network terminals. This makes it possible to omit a process of recovering the network.

In this manner, according to the above-described network terminal, even if the synchronization information frame from the master terminal misses due to a failure, without a process of allowing a network terminal to takeover the role of the master terminal being performed, the transmission of a synchronization information frame is started in the order of synchronization information frame transmission start times, a network terminal having the earliest synchronization information frame transmission start time transmits a synchronization information frame first. On this account, the network is swiftly recovered.

The network terminal of the present invention may be arranged such that the synchronization information frame transmission means generates, when the concerned network terminal acts as a network terminal, a synchronization information frame in such a manner as to include, in the synchronization information frame, at least a part of the information in the synchronization information frame supplied from the previous master terminal.

With this, after a failure occurs in the previous master terminal, the information (e.g. network management information), which was managed by the previous master terminal and was outputted as a part of the synchronization information frame, is handed over to the new master terminal, and was outputted as a part of the synchronization information frame from the new master terminal. In short, information is handed over from the master terminal before the failure to the master terminal after the failure.

Thus, it is unnecessary to carry out a process of setting the participation of network terminals to the network and the guarantee of bands for the terminals, i.e. it is unnecessary to carry out a process of recovering the network. For this reason, the data transport between the network terminal before the failure of the master terminal is promptly resumed.

A network terminal of the present invention, constituting a network system which is made up of a plurality of network terminals being capable of transmitting and receiving data and manages transmitting and receiving of data in accordance with a synchronization information frame periodically supplied from one of said plurality of network terminals which operates as a master terminal, comprises: synchronization information frame receiving means for receiving the synchronization information frame from said master terminal; network information managing means for managing the network by being synchronized with the synchronization information frame received by the synchronization information frame receiving means; synchronization information frame missing detection means for detecting a missing of the synchronization information frame from said master terminal, when the synchronization information frame receiving means does not receive the synchronization information frame; synchronization information transmission start time storing means for storing synchronization information frame transmission start time information which defines a synchronization information frame transmission start time, said plurality of network terminals having different synchronization information frame transmission start times; and synchronization information frame transmitting means for, in a case where said network terminal acts as a new master terminal of the network system, periodically outputting a synchronization information frame including at least a part of information in the synchronization information frame received from said master terminal, from the synchronization information frame transmission start time defined by the synchronization information frame transmission start time information stored in the synchronization information transmission start time storing means, synchronization information frame transmitting means starting to output the synchronization information frame after the synchronization information frame missing detection means detects the missing of the synchronization information frame after the synchronization information frame missing detection means detects the missing of the synchronization information frame, the synchronization information frame receiving means awaiting for a synchronization information frame from one of said plurality of network terminals whose synchronization information transmission start time is earlier than the synchronization information transmission start time of said network terminal, until the synchronization information frame transmission start time of said network terminal comes.

Also, a method of controlling a network terminal, constituting a network system which is made up of a plurality of network terminals being capable of transmitting and receiving data and manages transmitting and receiving of data in accordance with a synchronization information frame periodically supplied from one of said plurality of network terminals which operates as a master terminal, comprises the steps of: detecting a missing of the synchronization information frame from said master terminal, when the synchronization information frame is not supplied from said master terminal; in a case where said network terminal acts as a new master terminal of the network system, periodically outputting a synchronization information frame including at least a part of information in the synchronization information frame received from said master terminal, from the synchronization information frame transmission start time defined by the synchronization information frame transmission start time information stored in the synchronization information transmission start time storing means, after detecting the missing of the synchronization information frame; and awaiting for a synchronization information frame from one of said plurality of network terminals whose synchronization information transmission start time is earlier than the synchronization information transmission start time of said network terminal, until the synchronization information frame transmission start time of said network terminal comes.

Moreover, the network terminal of the present invention further comprises synchronization information frame transmission start time generating means for determining sets of synchronization information frame transmission start time information corresponding to said plurality of network terminals of the network system, and transmitting the sets of synchronization information frame transmission start time information to said plurality of network terminals, when said network terminal acts as a master terminal.

With the above, while operating as a master terminal, the network terminal generates the sets of synchronization information frame transmission start time information of respective network terminals, which are for determining the next master terminal, and transmits these sets of information to the corresponding network terminals.

In this manner, the sets of synchronization information frame transmission start time information corresponding to the respective network terminals are determined in advance and stored in the respective network terminals. This makes it possible to promptly recover the network even if the synchronization information frame from the master terminal misses.

Moreover, the network terminal of the present invention is arranged such that the synchronization information frame transmission start time information indicates priorities of said plurality of network terminals of the network system, for selecting a master terminal.

With this, the network terminal synchronization information frame transmission start time information of the network terminal is designated with reference to the priority of the network terminal for a master terminal. Note that, the synchronization information frame transmission start time is figured out by multiplying the priority by a predetermined unit time.

In this manner, since the information to be supplied to the network terminal indicates the priority, it is possible to directly designate the order to be the next master terminal. This also reduces memory for storing the synchronization information frame transmission start time information.

The network terminal of the present invention is arranged such that the synchronization information frame transmission start time information generating means determines the sets of synchronization information frame transmission start time information, on ground of capabilities of said plurality of network terminals as a master terminal of the network system.

In this manner, the synchronization information frame transmission start time information of the network terminal is generated on ground of capabilities of the network terminal as a master terminal, the capabilities including the number of manageable network terminals and the capability of managing the band of data transport between the network terminals.

Thus, with the above-mentioned network terminal, a network terminal which is the most suitable for managing the network is selected as a new master terminal. For this reason, it is possible to decrease the likelihood of a failure in the network, which is because a newly-selected master terminal has managing capabilities lower than those of the previous master terminal.

The network terminal of the present invention is arranged such that, the synchronization information frame transmission start time information generating means determines the sets of synchronization information frame transmission start time information of one of said plurality of network terminals, on ground of priorities of sets of data transmitted from said plurality of network terminals.

In this manner, the synchronization information frame transmission start time information is generated on ground of the priorities of the sets data transmitted from the network terminals.

Thus, according to the network terminal, a network terminal transmitting a set of data having the highest priority is selected as a new master terminal. For this reason, it is possible to give priority to the resumption of data transport having a high priority.

The network terminal of the present invention is arranged such that the synchronization information frame transmitting means determines the synchronization information frame transmission start time, on ground of a time calculated by multiplying said priorities by a predetermined unit time.

In this manner, the network terminal starts to supply a synchronization information frame, from the synchronization information frame transmission start time which is figured out in such a manner that, to a time on which the missing of the synchronization information frame is detected, a result of multiplying the priority by a unit time is added.

Thus, according to the above-described network terminal, it is possible to prevent more than one network terminal from simultaneously starting to transmit synchronization information frames, and to figure out when each of the network terminals transmit a synchronization information frame. This makes it possible to clearly recognize a synchronization information frame transmitted from another master terminal.

The network terminal of the present invention is arranged such that, if it is impossible to generate a synchronization information frame including all sets of information in the synchronization information frame received from said master terminal, the synchronization information frame transmitting means determines which set of information is included in a synchronization information frame, in accordance with priorities of sets of data exchanged between said plurality of network terminals.

With the above, when a network terminal is selected as a new master terminal but has lower capabilities than the previous master terminal and hence not all of the information, e.g. band guarantee period information, of the previous master terminal cannot be included in a synchronization information frame of the new master terminal, the network terminal selects which set of information is included in a synchronization information frame, in accordance with the presence of data transport between the network terminals and the priorities of sets of data exchanged between the network terminals.

Thus, the above-described network terminal makes it possible to give priority to the resumption of data transport having a high priority.

The network system of the present invention is arranged so as to include a plurality of the above-described network terminals.

With this, even if the synchronization information frame from the master terminal misses due to a failure occurring in the master terminal, the transmission of a synchronization information frame is started in the order of synchronization information frame transmission start times, a network terminal having the earliest synchronization information frame transmission start time transmits a synchronization information frame first. On this account, the network is swiftly recovered.

Thus, it is possible to realize a network terminal which can shorten a period of no interaction between network terminals when a master terminal administering the network becomes not able to transmit a synchronization information frame.

A program of the present invention causes a computer to operate as sections of a network terminal constituting a network system which is made up of a plurality of network terminals being capable of transmitting and receiving data and manages transmitting and receiving of data in accordance with a synchronization information frame periodically supplied from one of said plurality of network terminals which operates as a master terminal, said network terminal comprising: synchronization information frame receiving means for receiving the synchronization information frame from said master terminal; network information managing means for managing the network by being synchronized with the synchronization information frame received by the synchronization information frame receiving means; synchronization information frame missing detection means for detecting a missing of the synchronization information frame from said master terminal, when the synchronization information frame receiving means does not receive the synchronization information frame; synchronization information transmission start time storing means for storing synchronization information frame transmission start time information which defines a synchronization information frame transmission start time, said plurality of network terminals having different synchronization information frame transmission start times; and synchronization information frame transmitting means for, in a case where said network terminal acts as a new master terminal of the network system, periodically outputting a synchronization information frame including at least a part of information in the synchronization information frame received from said master terminal, from the synchronization information frame transmission start time defined by the synchronization information frame transmission start time information stored in the synchronization information transmission start time storing means, synchronization information frame transmitting means starting to output the synchronization information frame after the synchronization information frame missing detection means detects the missing of the synchronization information frame, after the synchronization information frame missing detection means detects the missing of the synchronization information frame, the synchronization information frame receiving means awaiting for a synchronization information frame from one of said plurality of network terminals whose synchronization information transmission start time is earlier than the synchronization information transmission start time of said network terminal, until the synchronization information frame transmission start time of said network terminal comes.

This makes it possible for the users to acquire the above-described network terminal by downloading the foregoing program to one's own computer system.

The network terminal can also be provided to the users by storing the program in a recording medium in advance and then allowing the users to load this program stored in the recording medium to one's own computer system.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A network terminal constituting a network system which is made up of a plurality of network terminals being capable of transmitting and receiving data and manages transmitting and receiving of data in accordance with a synchronization information frame periodically supplied from one of said plurality of network terminals which operates as a master terminal, said network terminal comprising:
synchronization information frame receiving means for receiving the synchronization information frame from said master terminal;
network information managing means for managing the network by being synchronized with the synchronization information frame received by the synchronization information frame receiving means;
synchronization information frame missing detection means for detecting a missing of the synchronization information frame from said master terminal, when the synchronization information frame receiving means does not receive the synchronization information frame;
synchronization information transmission start time storing means for storing synchronization information frame transmission start time information which defines a synchronization information frame transmission start time, said plurality of network terminals having different synchronization information frame transmission start times; and
synchronization information frame transmitting means for, in a case where said network terminal acts as a new master terminal of the network system, periodically outputting a synchronization information frame including at least a part of information in the synchronization information frame received from said master terminal, from the synchronization information frame transmission start time defined by the synchronization information frame transmission start time information stored in the synchronization information transmission start time storing means, synchronization information frame transmitting means starting to output the synchronization information frame after the synchronization information frame missing detection means detects the missing of the synchronization information frame,
after the synchronization information frame missing detection means detects the missing of the synchronization information frame, the synchronization information frame receiving means awaiting for a synchronization information frame from one of said plurality of network terminals whose synchronization information transmission start time is earlier than the synchronization information transmission start time of said network terminal, until the synchronization information frame transmission start time of said network terminal comes,
the network terminal further comprising:
synchronization information frame transmission start time generating means for determining sets of synchronization information frame transmission start time information corresponding to said plurality of network terminals of the network system, and transmitting the sets of synchronization information frame transmission start time information to said plurality of network terminals, when said network terminal acts as a master terminal, wherein the synchronization information frame transmission start time information generating means determines the sets of synchronization information frame transmission start time information on ground of priorities of sets of data transmitted from said plurality of network terminals.

2. The network terminal as defined in claim 1, wherein, the synchronization information frame transmission start time information indicates priorities of said plurality of network terminals of the network system, for selecting a master terminal.

3. The network terminal as defined in claim 1, wherein, the synchronization information frame transmission start time information generating means determines the sets of synchronization information frame transmission start time information, on ground of capabilities of said plurality of network terminals as a master terminal of the network system.

4. The network terminal as defined in claim 2, wherein, the synchronization information frame transmitting means determines the synchronization information frame transmission start time, on ground of a time calculated by multiplying said priorities by a predetermined unit time.

5. The network terminal as defined in claim 1, wherein, if it is impossible to generate a synchronization information frame including all sets of information in the synchronization information frame received from said master terminal, the synchronization information frame transmitting means determines which set of information is included in a synchronization information frame, in accordance with priorities of sets of data exchanged between said plurality of network terminals.

6. The network terminal of claim 1, wherein the synchronization information frame includes at least one of a network identifier for identifying the network system, a master terminal inherent number for identifying a sender of the synchronization information frame, a synchronization information frame interval indicating when the next synchronization information frame is sent, and band guarantee period information for specifying network terminals which can transmit information to another network terminal and for guaranteeing a transmission band.

7. A network system which is made up of a plurality of network terminals being capable of transmitting and receiving data and manages transmitting and receiving of data in accordance with a synchronization information frame periodically supplied from one of said plurality of network terminals which operates as a master terminal, a network terminal, which is one of said plurality of network terminals, comprising:
synchronization information frame receiving means for receiving the synchronization information frame from said master terminal;
network information managing means for managing the network by being synchronized with the synchronization information frame received by the synchronization information frame receiving means;
synchronization information frame missing detection means for detecting a missing of the synchronization information frame from said master terminal, when the synchronization information frame receiving means does not receive the synchronization information frame;

synchronization information transmission start time storing means for storing synchronization information frame transmission start time information which defines a synchronization information frame transmission start time, said plurality of network terminals having different synchronization information frame transmission start times; and synchronization information frame transmitting means for, in a case where said network terminal acts as a new master terminal of the network system, periodically outputting a synchronization information frame including at least a part of information in the synchronization information frame received from said master terminal, from the synchronization information frame transmission start time defined by the synchronization information frame transmission start time information stored in the synchronization information transmission start time storing means, synchronization information frame transmitting means starting to output the synchronization information frame after the synchronization information frame missing detection means detects the missing of the synchronization information frame, after the synchronization information frame missing detection means detects the missing of the synchronization information frame, the synchronization information frame receiving means awaiting for a synchronization information frame from one of said plurality of network terminals whose synchronization information transmission start time is earlier than the synchronization information transmission start time of said network terminal, until the synchronization information frame transmission start time of said network terminal comes, wherein, said network terminal further comprising synchronization information frame transmission start time generating means for determining sets of synchronization information frame transmission start time information corresponding to said plurality of network terminals of the network system, and transmitting the sets of synchronization information frame transmission start time information to said plurality of network terminals, when said network terminal acts as a master terminal, wherein the synchronization information frame transmission start time information generating means determines the sets of synchronization information frame transmission start time information on ground of priorities of sets of data transmitted from said plurality of network terminals.

8. The network system as defined in claim 7, wherein, the synchronization information frame transmission start time information indicates priorities of said plurality of network terminals of the network system, for selecting a master terminal.

9. A method of controlling a network terminal constituting a network system which is made up of a plurality of network terminals being capable of transmitting and receiving data and manages transmitting and receiving of data in accordance with a synchronization information frame periodically supplied from one of said plurality of network terminals which operates as a master terminal, the method comprising the steps of:

detecting a missing of the synchronization information frame from said master terminal, when the synchronization information frame is not supplied from said master terminal;

in a case where said network terminal acts as a new master terminal of the network system, periodically outputting a synchronization information frame including at least a part of information in the synchronization information frame received from said master terminal, from the synchronization information frame transmission start time defined by the synchronization information frame transmission start time information stored in the synchronization information transmission start time storing means, after detecting the missing of the synchronization information frame; and awaiting for a synchronization information frame from one of said plurality of network terminals whose synchronization information transmission start time is earlier than the synchronization information transmission start time of said network terminal, until the synchronization information frame transmission start time of said network terminal comes, the method further comprising:

determining sets of synchronization information frame transmission start time information corresponding to said plurality of network terminals of the network system, and transmitting the sets of synchronization information frame transmission start time information to said plurality of network terminals, when said network terminal acts as a master terminal, wherein the sets of synchronization information frame transmission start time information are determined on ground of priorities of sets of data transmitted from said plurality of network terminals.

10. A computer readable medium, storing a set of instructions, executed by a processor, causing a computer to operate as sections of a network terminal constituting a network system which is made up of a plurality of network terminals being capable of transmitting and receiving data and manages transmitting and receiving of data in accordance with a synchronization information frame periodically supplied from one of said plurality of network terminals which operates as a master terminal, said network terminal:

receiving the synchronization information frame from said master terminal;

managing the network by being synchronized with the synchronization information frame;

detecting a missing of the synchronization information frame from said master terminal, when the synchronization information frame is not received;

storing synchronization information frame transmission start time information which defines a synchronization information frame transmission start time, said plurality of network terminals having different synchronization information frame transmission start times; and in a case where said network terminal acts as a new master terminal of the network system, periodically outputting a synchronization information frame including at least a part of information in the synchronization information frame received from said master terminal, from the synchronization information frame transmission start time defined by the synchronization information frame transmission start time information, starting to output the synchronization information frame after detecting the missing of the synchronization information frame, after detecting the missing of the synchronization information frame, awaiting for a synchronization information frame from one of said plurality of network terminals whose synchronization information transmission start time is earlier than the synchronization information transmission start time of said network terminal, until the synchronization information frame transmission start time of said network terminal comes, the network terminal further determining sets of synchronization information frame transmission start time information corresponding to said plurality of network terminals of the network system, and transmitting the sets of synchronization information frame transmission start time information to said plurality of network terminals, when said network terminal acts as a master terminal, wherein the sets of synchronization information frame transmission start time information are determined on ground of priorities of sets of data transmitted from said plurality of network terminals.

11. A network terminal constituting a network system which is made up of a plurality of network terminals being capable of transmitting and receiving data and manages transmitting and receiving of data in accordance with a synchronization information frame periodically supplied from one of said plurality of network terminals which operates as a master terminal, said network terminal comprising:

synchronization information frame receiving section receiving the synchronization information frame from said master terminal;

network information managing section for managing the network by being synchronized with the synchronization information frame received by the synchronization information frame receiving section;

synchronization information frame missing detection section for detecting a missing of the synchronization information frame from said master terminal, when the synchronization information frame receiving section does not receive the synchronization information frame;

priority list storing section for storing a priority list which defines a start time of transmission of the synchronization information frame of each of said plurality of network terminals, each of said plurality of network terminals having a different priority, wherein the priority list storing section determines the sets of synchronization information frame transmission start time information on ground of priorities of sets of data transmitted from said plurality of network terminals; and synchronization information frame transmitting section for, in a case where said network terminal acts as a new master terminal of the network system, periodically outputting a synchronization information frame including at least a part of information in the synchronization information frame received from said master terminal, from the start time defined by the priority list stored in the priority list storing section, synchronization information frame transmitting section starting to output the synchronization information frame after the synchronization information frame missing detection section detects the missing of the synchronization information frame, after the synchronization information frame missing detection section detects the missing of the synchronization information frame, the synchronization information frame receiving section waits for a synchronization information frame from one of said plurality of network terminals whose start time is earlier than the start time of said network terminal, until the start time of said network terminal comes, priority list generating section determining an updated priority list including an updated priority corresponding to each of said plurality of network terminals of the network system, and transmitting the priority list to said plurality of network terminals, when said network terminal acts as a master terminal.

* * * * *